(12) United States Patent
David et al.

(10) Patent No.: US 8,194,126 B2
(45) Date of Patent: Jun. 5, 2012

(54) GATED IMAGING

(75) Inventors: Ofer David, Haifa (IL); Shamir Inbar, Haifa (IL)

(73) Assignee: Elbit Systems Ltd., Haifa (IL)

( * ) Notice: Subject to any disclaimer, the term of this patent is extended or adjusted under 35 U.S.C. 154(b) by 1678 days.

(21) Appl. No.: 11/496,031

(22) Filed: Jul. 27, 2006

(65) Prior Publication Data
US 2007/0058038 A1 Mar. 15, 2007

Related U.S. Application Data

(63) Continuation of application No. PCT/IL2005/000085, filed on Jan. 24, 2005.

(30) Foreign Application Priority Data

Feb. 4, 2004 (IL) .......................................... 160220
Nov. 8, 2004 (IL) .......................................... 165090

(51) Int. Cl.
*H04N 7/18* (2006.01)
(52) U.S. Cl. ...................................................... 348/139
(58) Field of Classification Search .................. 348/139;
*H04N 7/18*
See application file for complete search history.

(56) References Cited

U.S. PATENT DOCUMENTS

| | | | |
|---|---|---|---|
| 3,941,999 A | 3/1976 | Moyers, Jr. | |
| 3,947,119 A | 3/1976 | Bamberg et al. | |
| 4,151,415 A | 4/1979 | Lipke | |
| 4,708,473 A | 11/1987 | Metzdorff et al. | |
| 4,915,498 A | 4/1990 | Malek | |
| 5,408,541 A | 4/1995 | Sewell | |
| 5,414,439 A * | 5/1995 | Groves et al. | ........................ 345/7 |
| 7,733,464 B2 * | 6/2010 | David et al. | ................... 356/5.03 |
| 2001/0022636 A1 * | 9/2001 | Yang et al. | ........................ 349/65 |
| 2002/0180866 A1 * | 12/2002 | Monroe | ........................ 348/153 |
| 2003/0107323 A1 * | 6/2003 | Stam | ........................... 315/82 |
| 2005/0269481 A1 * | 12/2005 | David et al. | ................ 250/208.1 |
| 2007/0058038 A1 * | 3/2007 | David et al. | .................... 348/135 |

FOREIGN PATENT DOCUMENTS

| | | |
|---|---|---|
| EP | 0 353 200 | 1/1990 |
| EP | 0 750 202 | 12/1996 |
| WO | WO 2004/013654 A1 | 2/2004 |
| WO | WO 2004/072678 A1 | 8/2004 |
| WO | WO 2005/076037 A1 | 8/2005 |

OTHER PUBLICATIONS

International Search Report for International Application No. PCT/IL2005/000085, May 2, 2005 (4 pages).
Written Opinion of the International Searching Authority for International Application No. PCT/IL2005/000085 (6 pages).
International Preliminary Report on Patentability for International Application No. PCT/IL2005/000085, May 8, 2006 (31 pages).

* cited by examiner

*Primary Examiner* — Tung Vo
(74) *Attorney, Agent, or Firm* — Edwards Wildman Palmer LLP; Steven M. Jensen; Weiying Yang

(57) ABSTRACT

An imaging system, including a transmission source providing pulse(s), and a gated sensor for receiving pulse reflections from objects located beyond a minimal range. The pulse and the gate timing are controlled for creating a sensitivity as a function of range, such that the amount of the energy received progressively increases with the range. Also an imaging method, including emitting pulse(s) to a target area, receiving reflections of pulses reflected from objects located beyond a minimal range, the receiving includes gating detection of the reflections, and progressively increasing the received energy of the reflections, by controlling the pulses and the timing of the gating.

68 Claims, 17 Drawing Sheets

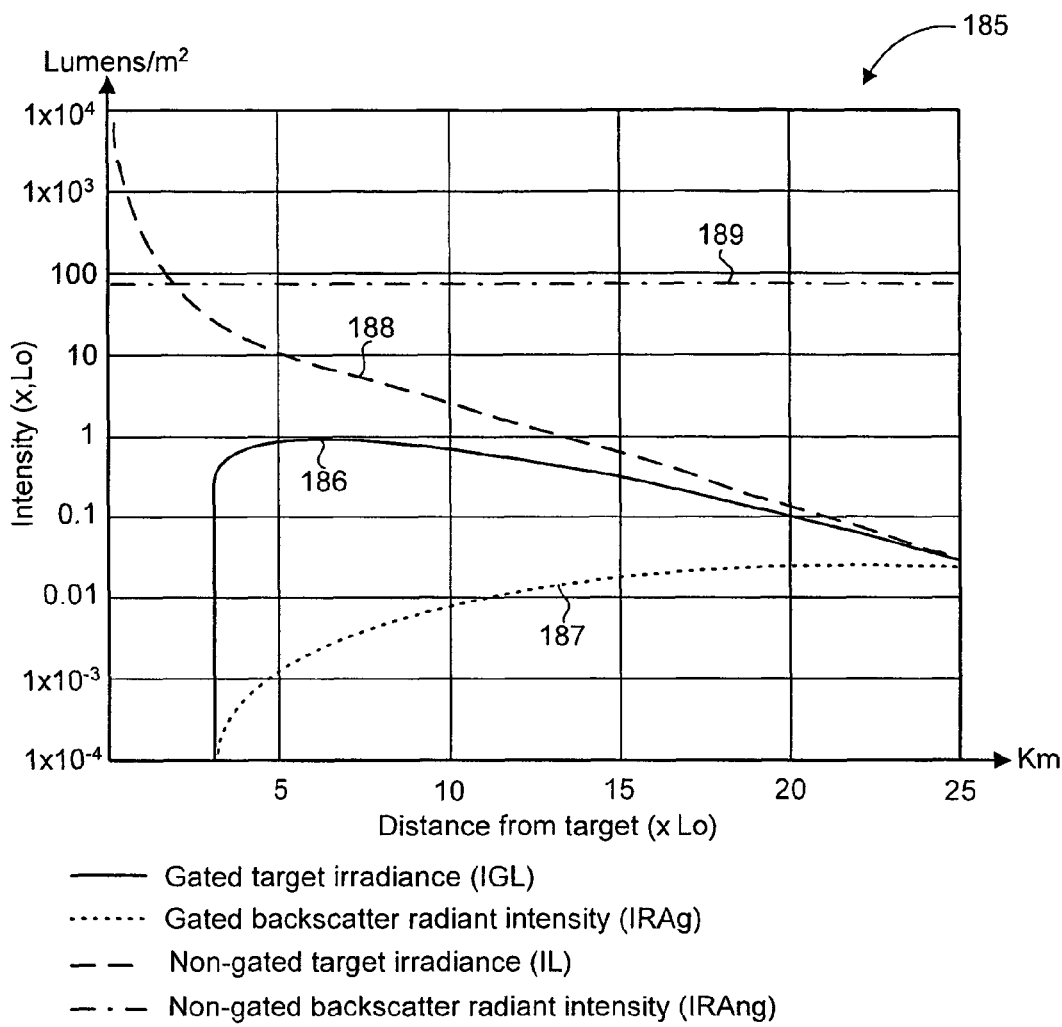

- Gated target irradiance (IGL)
- ...... Gated backscatter radiant intensity (IRAg)
- — — Non-gated target irradiance (IL)
- — · — Non-gated backscatter radiant intensity (IRAng)

Effective gated and non-gated laser irradiance on target and backscatter radiant intensity (lumens per square meter) as a function of range (kilometers), in a simulation of Long Pulse Gated Imaging (LPGI)

| V = 15 km | Sea level visibility range |
| H = 3 km | Platform/Target height above sea level |
| Lm = 3 km | Minimal range |
| Lo = 25 km | Optimal gating range |

FIG. 11

GATED IMAGING

CROSS-REFERENCE TO RELATED CASES

This is a continuation of International Application Number PCT/IL2005/000085 which designates the U.S. and which itself claims priority to and the benefit of both IL Patent Application No. 160220 (filed in Israel on Feb. 4, 2004) and IL Patent Application No. 165090 (filed in Israel on Nov. 8, 2004). International Application Number PCT/IL2005/000085 was filed via the Patent Cooperation Treaty on Jan. 24, 2005, and it published as International Publication Number WO 2005/076037 A1 on Aug. 18, 2005. Priority to and the benefit of International Application Number PCT/IL2005/000085, IL Patent Application No. 160220, and IL Patent Application No. 165090 is hereby claimed, and the contents of each of these three applications is hereby incorporated herein by reference.

FIELD OF THE DISCLOSED TECHNIQUE

The disclosed technique relates to optical observation systems in general, and to a method and system for imaging using the principle of gated imaging with active illumination, in particular.

BACKGROUND OF THE DISCLOSED TECHNIQUE

Target detection and identification using an imaging system that includes a camera is known in the art. Cameras, as known in the art, may be mounted on a plurality of objects, for example, closed circuit stationary cameras mounted on walls, geostationary satellites, portable cameras, that may also be mounted on a tripod, and moving platforms, including vehicles. Such a camera often requires a high level of sensitivity to light for use in poor visibility conditions. Also, a long focal lens is commonly employed to achieve high optical magnification. In conditions of poor visibility, for example at night, the low intensity of light reflected from a target, received by a camera used in an imaging system, results in low quality image resolution. In a case of low quality image resolution, such a camera cannot produce an image with an adequate signal-to-noise ratio to exploit the total resolution capability of the camera, and to discern fine details of an imaged target for identification purposes. Therefore, when imaging during night or in poor visibility conditions, such cameras require an auxiliary light source to illuminate a target and thereby improve the quality of the captured image. The auxiliary light source may be a laser device capable of producing a light beam that is parallel to the line-of-sight (LOS) of the camera, and that illuminates the field-of-view (FOV) of the camera or a part thereof. It is noted that television systems, in general, use a similar illumination method for adequate imaging. Also, long focal lenses, in general, have a limited light collecting capability due to their high f number. A high f number reduces the capability of a lens to collect enough photons to generate an adequate image, as compared to lenses with small f numbers.

An inherent problem in optical observation systems is the effect inclement weather conditions, such as humidity, haze, fog, mist, smoke and rain, have on the image produced. Particles or substances in the atmosphere may be associated with certain weather conditions. For example, haze results from aerosols in the air. These atmospheric particles or substances may obstruct the area between an observation system and a target to be observed. A similar case may result when an observation system operates in media other than air. For example, in underwater observations, the scattering of water particles, or of air particles above the water, may obstruct the area between an observation system and a target to be observed. In an observation system integrated with a laser device for target illumination, the interference of particles or substances in the medium between a system and a target can cause backscatter of the light beam. This is especially true when an auxiliary light source is used to illuminate a target at night, particularly if the illuminating source is located near the camera. The backscatter of the light beam results in blinding of a camera used in an observation system, especially if the camera has a high level of sensitivity, like an Intensified CCD (ICCD). The blinding of the camera reduces the contrast of an imaged target relative to the background. This blinding of the camera is referred to as self-blinding because it is partly caused by the observation system itself. During night conditions, contrast reduction significantly lowers the achievable range of imaging and target, or object, detection and identification, with respect to the attainable detection and identification range in daylight conditions.

In order to reduce the influence of particles or substances between an observation system and a target, and at night, in order to achieve longer identification ranges, the imaging sensor of a camera may need to be synchronized with respect to the time that the reflected light from the light illuminated target is due to be received by photodetectors located on the observation system. In particular, a laser generates short light pulses at a certain frequency. The imaging sensor of the camera is activated at the same frequency, but with a time delay that is related to the frequency. The light beam generated by the laser impinges on the target, and illuminates the target and the surrounding area. When the light beam is emitted toward the target, the receiving assembly of the imaging sensor of the camera is deactivated. A small part of the light is reflected from the target back towards the camera, which is activated as this reflected light reaches the camera.

Light which reflects off of particles or substances relatively close to the camera, in comparison to the longer distance between the camera and the target, will reach the receiving assembly of the camera while the camera is still deactivated. This light will therefore not be received by the camera and will not affect the contrast of the image. However, reflected light from the target and its nearby surroundings will reach the camera after the camera has been switched to an "on" state, and so light reflected towards the camera from the target will be fully collected by the camera.

The camera switches from an "off" state to an "on" state in a synchronized manner with the time required for the pulse to travel to the target and return. After the light reflected from the target has been received and stored, the camera reverts to an "off" state, and the system awaits transmission of the following light pulse. This cycle is repeated at a rate established in accordance with the range from the camera to the target, the speed of light in the observation medium, and the inherent limitations of the laser device and the camera. This technique is known as gated imaging with active illumination to minimize backscatter.

U.S. Pat. No. 5,408,541 to Sewell entitled "Method and System for Recognizing Targets at Long Ranges", is directed to a method and system for recognizing targets at ranges near or equal to ranges at which they are initially detected. A detect sensor, such as a radar system or a thermal imaging sensor, detects a target relative to a sensor platform. The detect sensor determines a set of range parameters, such as target coordinates from the sensor platform to the target. The detect sensor transfers the set of range parameters to a laser-aided image recognition sensor (LAIRS). The LAIRS uses the set of range parameters to orient the system to the angular location of the target. A laser source illuminates the area associated with the range parameters with an imaging laser pulse to generate reflected energy from the target. A gated television sensor receives the reflected energy from the illuminated target, and highly magnifies and images the reflected energy. The image is then recognized by either using an automatic target recognition system, displaying the image for operator recognition, or both.

It is noted that Sewell requires a preliminary range measurement. Before the laser source illuminates the target, the laser source directs a low power measurement laser pulse toward the target to measure the range between the system and the target. The range sets a gating signal for the gated television sensor. The gated television sensor is gated to turn on only when energy is reflected from the target. It is also noted that the measuring line to the target of the laser ranger must be parallel, in a very accurate manner, to the LOS of the observation system.

It is an object of the disclosed technique to provide a novel system and method for gated imaging using active illumination that does not require a preliminary range measurement. It is a further object of the disclosed technique to provide for target identification in the FOV of a camera from a minimal range.

SUMMARY OF THE DISCLOSED TECHNIQUE

In accordance with the disclosed technique, there is thus provided an imaging system having a transmission source, the transmission source providing at least one energy pulse. The system includes a sensor for receiving pulse reflections of the at least one energy pulse reflected from objects within a depth of a field to be imaged, the depth of field having a minimal range ($R_{MIN}$). The sensor is enabled to gate detection of the pulse reflections, with a gate timing which is controlled such that the sensor starts to receive the pulse reflections after a delay timing substantially given by the time it takes the at least one energy pulse to reach the minimal range and complete reflecting back to the sensor from the minimal range. The at least one energy pulse and the gate timing are controlled for creating a sensitivity as a function of range for the system, such that an amount of received energy of the pulse reflections, reflected from objects located beyond the minimal range, progressively increases with the range along the depth of a field to be imaged. According to one embodiment, this is provided through synchronization between the timing of the at least one energy pulse and the timing of the gate detection.

The at least one energy pulse and the gate timing may be controlled for creating a sensitivity as a function of range for the system, such that an amount of received energy of the pulse reflections, reflected from objects located beyond the minimal range, progressively increases with the range along the depth of a field to be imaged. The amount of received energy of the pulse reflections may increase progressively until an optimal range ($R_O$), be maintained detectable, be substantially constant, or decrease gradually until a maximal range ($R_{MAX}$), or is directly proportional to the ranges of the objects to be imaged.

According to another aspect of the disclosed technique, the at least one energy pulse defines a substantial pulse width ($T_{LASER}$) commencing at a start time ($T_0$), and the delay timing is substantially given by the time elapsing from the start time ($T_0$) until twice the minimal range ($R_{MIN}$) divided by the speed at which the at least one energy pulse travels (v), in addition to the pulse width ($T_{LASER}$) according to the formula:

$$\frac{2 \times R_{MIN}}{v} + T_{LASER}.$$

According to another embodiment, the at least one energy pulse defines a substantial pulse width ($T_{LASER}$), a pulse pattern, a pulse shape, and a pulse energy, the sensor is enabled to gate detection of the pulse reflections, with a gating time span the sensor is activated ($T_{ON}$), a duration of time the sensor is deactivated ($T_{OFF}$), and a synchronization timing of the gating with respect to the at least one energy pulse, and at least one of the delay timing, the pulse width, the pulse shape, the pulse pattern, the pulse energy, the gating time span the sensor is activated ($T_{ON}$), the duration of time the sensor is deactivated ($T_{OFF}$), and the synchronization timing, is determined according to at least one of the depth of a field to be imaged, specific environmental conditions the system is used in, a speed the system is moving at if the system is mounted on a moving platform, and specific characteristics of different objects expected to be found in the depth of field. The pulse width, the duration of time the sensor is deactivated, and the gating time span the sensor is activated may define a cycle time, wherein the at least one energy pulse is provided for a duration of the pulse width, the opening of the sensor is delayed for a duration of the duration of time the sensor is deactivated, and the pulse reflections are received for a duration of the gating time span the sensor is activated. The determination according to at least one of the depth of a field, the specific environmental conditions, the speed the system is moving at if the system is mounted on a moving platform, and the specific characteristics of different objects expected to be found in the depth of field, is preferably a dynamic determination, such as varying in an increasing or decreasing manner over time.

Optionally, the pulse width and the gating time span are limited to reduce the sensitivity of the system to ambient light sources. For example, the pulse width is shortened progressively, the delay timing is lengthened progressively, with the cycle time not changing. Alternatively, the gating time span is shortened progressively, the delay timing is lengthened progressively, with the cycle time not changing. In addition, the pulse width and the gating time span are shortened progressively, the delay timing is lengthened progressively, with the cycle time not changing.

According to another aspect, the gating of the sensor is utilized to create a sensitivity as a function of range for the system by changing a parameter such as changing the shape of the at least one energy pulse, changing the pattern of the at least one energy pulse, changing the energy of the at least one energy pulse, changing a gating time span the sensor is activated ($T_{ON}$), changing a duration of time the sensor is deactivated ($T_{OFF}$), changing a pulse width ($T_{LASER}$) of the at least one energy pulse, changing the delay timing, and changing a synchronization timing between the gating and the timing of providing the at least one energy pulse. The changing of a parameter may be utilized according to at least one of: the depth of field, specific environmental conditions the system is used in, a speed the system is moving at if the system is mounted on a moving platform, and characteristics of different objects expected to be found in the depth of field.

Optionally, a controller for controlling the synchronization is provided, preferably wherein at least one repetition of the cycle time forms part of an individual video frame, and a number of the repetitions forms an exposure number per video frame. Furthermore, preferably, a control mechanism for dynamically controlling and varying the exposure number is also provided. Mutual blinding between the system and a similar system passing one another is optionally eliminated by statistical solutions such as lowering the exposure number, a random or pre-defined change in the timing of the cycle time during the course of the individual video frame, and a change in frequency of the exposure number. Mutual blinding between the system and a similar system passing one another may also be eliminated by synchronic solutions such as establishing a communication channel between the system and the similar system, letting each of the system and the similar system go into listening modes from time to time in which the at least one energy pulse is not emitted for a listening period. After the listening period, any of the system and the similar system resumes emitting the at least one energy pulse if no pulses were collected during the listening period, and after which period the system and the similar system wait until an end of a cyclic sequence before resuming emitting the at least one energy pulse if pulses were collected during the listening period. Furthermore, having the systems change a pulse start transmission time in the individual video frames.

The exposure number may be varied by the control mechanism according to a level of ambient light. An image intensifier may be applied, in which case the exposure number may be varied by the control mechanism according to a level of current consumed by the image intensifier. The control mechanism may include image processing means for locating areas in the sensor in a state of saturation, and image processing means for processing a variable number of exposures. Such image processing means may be utilized to take at least two video frames, one with a high exposure number, the other with a low exposure number, where the exposure numbers of the at least two video frames are determined by the control mechanism. The at least two video frames are combined to form a single video frame by combining dark areas from frames with a high exposure number and saturated areas from frames with a low exposure number.

According to a further feature of the invention, a pulse width ($T_{LASER}$) of the at least one energy pulse is substantially defined in accordance with the following equation:

$$2 \times \left( \frac{R_0 - R_{MIN}}{v} \right),$$

where v is the speed at which the at least one energy pulse travels.

The at least one energy pulse may include several pulses wherein the sensor receives several pulses of the at least one energy pulse reflected from at least one object during the gating time span the sensor is activated.

The sensor may be enabled to gate detection of the pulsed reflections, with a gating time span the sensor is activated ($T_{ON}$), and a duration of time the sensor is deactivated ($T_{OFF}$), which are substantially defined in accordance with the following equations:

$$T_{ON} = 2 \times \left( \frac{R_0 - R_{MIN}}{v} \right)$$

and $$T_{OFF} = \frac{2 \times R_{MIN}}{v} + T_{LASER},$$

where $T_{LASER}$ is the pulse width of the at least one energy pulse, and v is the speed at which the at least one energy pulse travels.

Optionally, the sensor is enabled to gate detection of the pulse reflections in accordance with a Long Pulsed Gated Imaging (LPGI) timing technique. The sensor may also be enabled to gate detection of the pulse reflections with a gating time span the sensor is activated ($T_{ON}$), and a duration of time the sensor is deactivated ($T_{OFF}$), which are substantially defined in accordance with the following equations:

$$T_{ON} = 2 \times \left( \frac{R_{MAX} - R_{MIN}}{v} \right)$$

and $$T_{OFF} = \frac{2 \times R_{MAX}}{v},$$

where v is the speed at which the at least one energy pulse travels.

The at least one energy pulse may be in the form of electromagnetic energy or mechanical energy.

The sensor may be a Complementary Metal Oxide Semiconductor (CMOS), a Charge Coupled Device (CCD), a Gated Intensifier Charge Injection Device (GICID), a Gated Intensified CCD (GICCD), a Gated Intensified Active Pixel Sensor (GIAPS), and a Gated Image Intensifier.

The sensor may further include an external shutter, at least one photodetector, and may also be enabled to autogate.

A display apparatus for displaying images constructed from the light received in the sensor may also be used, for example, a Head Up Display (HUD) apparatus, an LCD display apparatus, a planar optic apparatus, and a holographic based flat optic apparatus.

A storage unit for storing images constructed from the pulse reflections received in the sensor may be provided, as well as a transmission device for transmitting images constructed from the pulse reflections received in the sensor.

The system may be mounted on a moving platform, and stabilized. Stabilization may preferably include stabilization using a gimbals, stabilization using feedback from a gyroscope to a gimbals, stabilization using image processing techniques, based on a spatial correlation between consecutively generated images of the object to be imaged, and stabilization based on sensed vibrations of the sensor. Optionally, the system includes at least one ambient light sensor.

Furthermore, a pulse detector for detection of pulses emitting from a similar system approaching may be provided, an image-processing unit may be added, a narrow band pass filter may be functionally connected to the sensor, and a spatial modulator shutter, or a spatial light modulator, may be provided. Optionally, an optical fiber for transmitting the at least one energy pulse towards the objects to be imaged may be added. Furthermore, a polarizer, for filtering out incoming energy which does not conform to the polarization of the pulse reflection, emitted from the transmission source providing the at least one polarized energy pulse, may be provided.

Preferably, the sensitivity of the system relates to a gain and responsiveness of the sensor in proportion to an amount of energy received by the sensor, wherein the gain received by the sensor as a function of range R is defined by the follow convolution formula:

$$I_r(R) = \frac{\int_{T_{LASER}+T_{OFF}}^{T_{LASER}+T_{OFF}+T_{ON}} L\left(t - \frac{2R}{v}\right) \cdot C(t) dt}{T_{LASER}}$$

wherein L(t) defines a Boolean function representing an on/off status of the transmission source, irrespective of a state of the sensor, where L(t)=1 if the transmission source is on and L(t)=0 if the transmission source is off. C(t) defines a Boolean function representing an ability of the sensor to receive incoming pulse reflections according to a state of the sensor, where C(t)=1 if the sensor is in an activated state and C(t)=0 if the sensor is in a deactivated state, and v is the speed at which the at least one energy pulse travels. A value for radiant intensity may be obtained by multiplying the convolution formula by a geometrical propagation attenuation function.

The transmission device may be a laser generator, an array of diodes, an array of LEDs, and a visible light source.

According to a further aspect of the invention, there is also provided an imaging method, including emitting at least one energy pulse to a target area, receiving at least one reflection of the at least one energy pulse reflected from objects within a depth of a field to be imaged, the depth of field having a minimal range ($R_{MIN}$), the receiving includes gating detection of the at least one reflection such that the at least one energy pulse is detected after a delay timing substantially given by the time it takes the at least one energy pulse to reach the minimal range and complete reflecting back, and progressively increasing the received energy of the at least one reflection reflected from objects located beyond the minimal range along the depth of a field to be imaged, by controlling the at least one energy pulse and the timing of the gating.

Preferably, the procedure of increasing includes increasing the received energy of the at least one reflection reflected from objects located beyond the minimal range along the depth of a field to be imaged up to an optimal range ($R_O$). Furthermore, the received energy of the at least one reflection reflected from objects located beyond the optimal range is maintained detectable along the depth of a field to be imaged up to a maximal range ($R_{MAX}$). This may be achieved by maintaining the received energy, of the at least one reflection reflected from objects located beyond the optimal range along the depth of a field to be imaged up to the maximal range, substantially constant, by gradually decreasing the received energy, or by increasing the received energy of the at least one reflection in direct proportion to the ranges of the objects within the depth of field to be imaged.

Optionally, the at least one energy pulse defines a substantial pulse width ($T_{LASER}$) commencing at a start time ($T_0$), and the delay timing is substantially given by the time elapsing from the start time ($T_0$) until twice the minimal range divided by the speed at which the at least one energy pulse travels (v), in addition to the pulse width ($T_{LASER}$):

$$T_{LASER} + \frac{2 \times R_{MIN}}{v}.$$

Furthermore, the at least one energy pulse defines a substantial pulse width ($T_{LASER}$), a pulse pattern, a pulse shape, and a pulse energy. The procedure of gating includes a gating time span a sensor utilized for the receiving is activated ($T_{ON}$), a duration of time the sensor is deactivated ($T_{OFF}$), and a synchronization timing of the gating with respect to the at least one energy pulse. At least one of the delay timing, the pulse width, the pulse shape, the pulse pattern, the pulse energy, the gating time span the sensor is activated ($T_{ON}$), the duration of time the sensor is deactivated ($T_{OFF}$), and the synchronization timing is determined according to at least one of the depth of a field, specific environmental conditions the method is used in, a moving speed of a moving platform if the sensor is mounted on the moving platform, and specific characteristics of different objects expected to be found in the depth of field.

Optionally, the method further includes the procedure of autogating.

Preferably, the procedure of controlling includes progressively changing at least one parameter such as changing a pattern of the at least one energy pulse, changing a shape of the at least one energy pulse, changing the energy of the at least one energy pulse, changing a gating time span a sensor utilized for the receiving is activated ($T_{ON}$), changing a duration of time the sensor is deactivated ($T_{OFF}$), changing an energy pulse width ($T_{LASER}$) of the at least one energy pulse, changing the delay timing, and changing a synchronization timing between the gating and the emitting. The procedure of controlling may also include changing the at least one parameter according to at least one of the depth of field, the specific environmental conditions the method is used in, the moving speed of the moving platform if the sensor is mounted on the moving platform, and characteristics of different objects expected to be found in the depth of field. The procedure of controlling may further include the sub-procedures of providing the at least one energy pulse for a duration of the pulse width, delaying the opening of the sensor for a duration of the time the sensor is deactivated ($T_{OFF}$), and receiving energy pulses reflected from objects for a duration of the gating time span the sensor is activated ($T_{ON}$). The pulse width, the duration of the time the sensor is deactivated ($T_{OFF}$) and the gating time span the sensor is activated ($T_{ON}$) may define a cycle time. Optionally, at least one repetition of the cycle time may form part of an individual video frame, and a number of repetitions may form an exposure number for the video frame.

The method may further include the procedure of eliminating mutual blinding between a system using the method and a similar system using the method, passing one another, by statistical solutions such as lowering the exposure number, a random or pre-defined change in the timing of the cycle time during the course of an individual video frame, and a change in the frequency of the exposure number. Alternatively, the method may further include the procedure of eliminating mutual blinding between a system using the method and a similar system using the method passing one another, by synchronic solutions such as establishing a communication channel between the system and the similar system, letting each of the system and the similar system go into listening modes from time to time in which the at least one energy pulse is not emitted for a listening period. After the listening period, any of the system and the similar system resume emitting the at least one energy pulse if no pulses were collected during the listening period, and after which period the system and the similar system wait until an end of a cyclic sequence before resuming emitting the at least one energy pulse if pulses were collected during the listening period. Furthermore, having the systems change a pulse start transmission time in the individual video frames.

The exposure number may be dynamically varied by a control mechanism, such as by adjusting the exposure number according to a level of ambient light, or adjusting the exposure number by the control mechanism according to a level of current consumed by an image intensifier utilized for intensifying the detection of the at least one reflection. Optionally, the method also includes image processing by locating areas in the sensor in a state of saturation by the control mechanism. The image processing may be applied for a variable number of exposures by the control mechanism. The image processing can include taking at least two video frames, one with a high exposure number, the other with a low exposure number, by image processing of a variable number of exposures, determining exposure numbers for the at least two video frames, and combining frames to form a single video frame by combining dark areas from frames with a high exposure number and saturated areas from frames with a low exposure number. Preferably, the pulse width and the gating time span the sensor is activated ($T_{ON}$) are limited to eliminate or reduce the sensitivity of the sensor to ambient light sources.

Preferably, the procedure of increasing is dynamic, such as by varying the sensitivity of the sensor in a manner varying over time such as in an increasing, a decreasing, a partially increasing and a partially decreasing manner over time.

The procedure of controlling may include shortening the pulse width progressively and lengthening the delay timing progressively, while retaining a cycle time of the gating unchanged, shortening the gating time span progressively and lengthening the delay timing progressively, while retaining a cycle time of the gating unchanged, or shortening the pulse width and the gating time span progressively, lengthening the delay timing progressively, while retaining a cycle time of the gating unchanged.

Preferably, the method includes the procedure of calculating the energy pulse width ($T_{LASER}$), substantially defined in accordance with the following equation:

$$2 \times \left( \frac{R_0 - R_{MIN}}{v} \right),$$

where v is the speed the at least one energy pulse travels at.

The procedure of receiving may include receiving several pulses of the at least one energy pulse reflected from objects during a gating time span a sensor utilized for the receiving is activated ($T_{ON}$). The gating may also include a duration of time the sensor is deactivated ($T_{OFF}$), and the controlling may include controlling the gating time span the sensor is activated $T_{ON}$ and a duration of time the sensor is deactivated $T_{OFF}$, substantially defined in accordance with the following equations:

$$T_{ON} = 2 \times \left( \frac{R_0 - R_{MIN}}{v} \right)$$

and $$T_{OFF} = \frac{2 \times R_{MIN}}{v} + T_{LASER},$$

where $R_0$ is an optimal range.

Optionally, the gating may include gating in accordance with a Long Pulsed Gated Imaging (LPGI) timing technique, such as when a gating time span a sensor utilized for the receiving is activated ($T_{ON}$), and a duration of time the sensor is deactivated ($T_{OFF}$), are substantially defined in accordance with the following equations:

$$T_{ON} = 2 \times \left( \frac{R_{MAX} - R_{MIN}}{v} \right)$$

and $$T_{OFF} = \frac{2 \times R_{MAX}}{v},$$

where v is the speed the at least one energy pulse travels at.

The procedure of emitting may include emitting at least one energy pulse in the form of electromagnetic energy or mechanical energy, and generating the at least one energy pulse by an emitter such as a laser generator, an array of diodes, an array of LEDs, or a visible light source.

The gating may include gating by a sensor, such as a Complementary Metal Oxide Semiconductor (CMOS), a Charge Coupled Device (CCD), a Gated Intensifier Charge Injection Device (GICID), a Gated Intensified CCD (GICCD), and a Gated Intensified Active Pixel Sensor (GI-APS), and gating with a CCD sensor that includes an external shutter.

Preferably, the method further includes the procedure of intensifying the detection of the at least one reflection, by intensifying the at least one reflection with a gated image intensifier or with a sensor with shutter capabilities.

Optionally, the method also includes displaying at least one image constructed from the received at least one reflection. The displaying may be on a display apparatus, for example, a Head Up Display (HUD), an LCD display, a planar optic display, and a holographic based flat optic display.

Furthermore, the method also includes storing or transmitting at least one image constructed from the received at least one reflection.

The method may also include determining the level of ambient light in the target area, determining if other energy pulses are present in the target area, filtering received energy pulse reflections using a narrow band pass filter, and overcoming glare from other energy pulses by locally darkening the entrance of an image intensifier utilized for the intensifying by using apparatuses such as a spatial modulator shutter, a spatial light modulator, or a liquid crystal display.

Optionally, the procedure of emitting includes emitting at least one polarized electromagnetic pulse, and the procedure of receiving includes filtering received energy according to a polarization conforming to an expected polarization of the at least one reflection.

BRIEF DESCRIPTION OF THE DRAWINGS

The disclosed technique will be understood and appreciated, more fully from the following detailed description taken in conjunction with the drawings in which:

FIG. 11 is a graph depicting the radiant intensity captured by a sensor from reflections from a target and from backscatter, as a function of the range between the sensor and the target, for both a gated and a non-gated sensor, during a simulation;

DETAILED DESCRIPTION OF THE EMBODIMENTS

Figure 1:
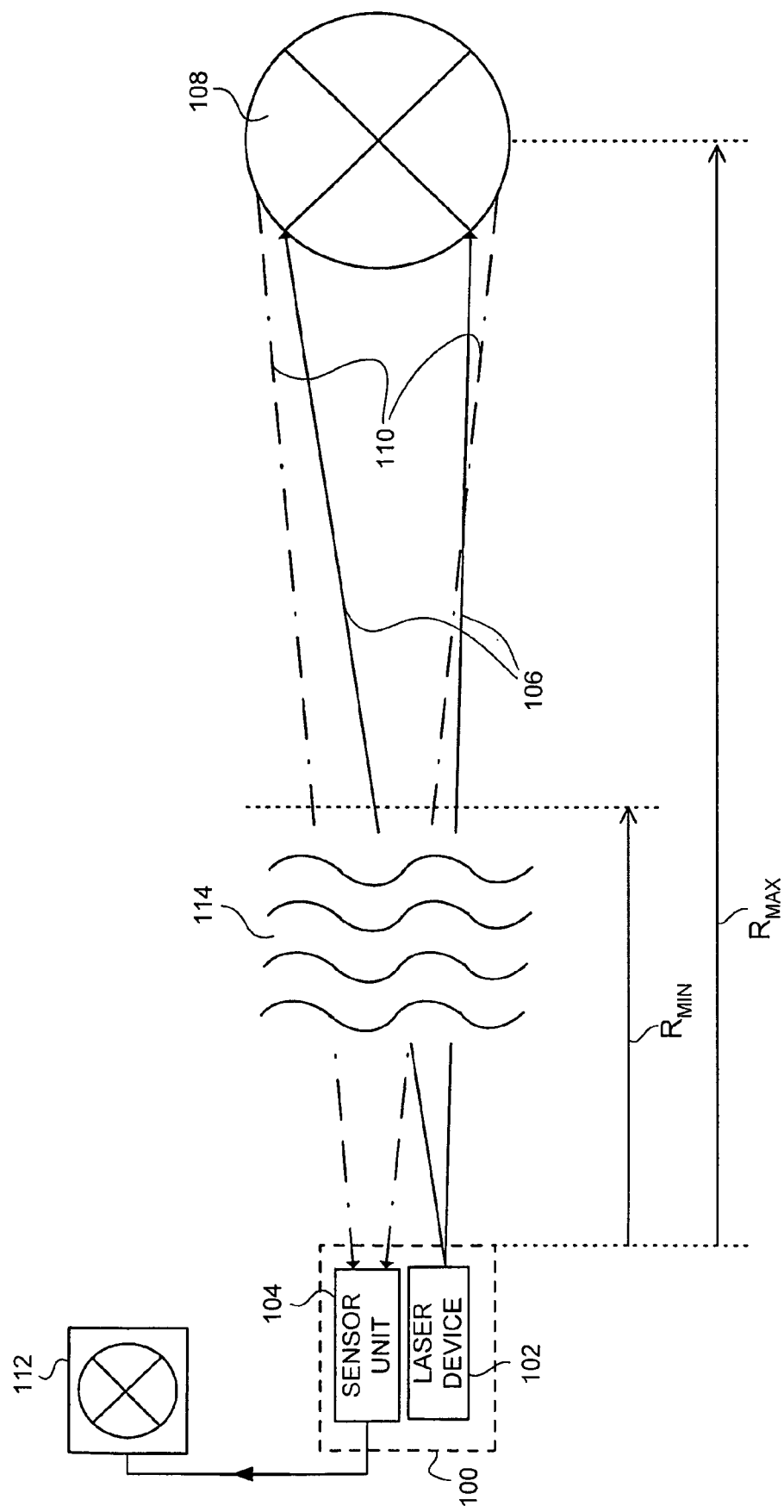
FIG. 1 is a schematic illustration of the operation of a system, constructed and operative in accordance with an embodiment of the disclosed technique.

The disclosed technique provides methods and systems for target or object detection, identification and imaging, using optical observation techniques based on the gated imaging principle with active illumination. The disclosed technique is applicable to any kind of imaging in any range scale, including short ranges on the order of hundreds of meters, and also extremely short ranges, such as ranges on the order of centimeters, millimeters and even smaller units of measurement, for industrial and laboratory applications. Accordingly, the terms "target" or "object" refer to any object in general, and although the disclosed technique described herein is with reference to "detection and identification", it is equally applicable to any kind of image acquisition for any purpose, such as picturing, filming, acquiring visual information, and the like. The disclosed technique described herein is with reference to laser light pulses, however any suitable pulsed emission of electromagnetic energy radiation (photons in any known wavelength) may be used, including light in the visible and non-visible spectrum, UV, near and far IR, radar, microwave, RF, gamma or other photon radiation, and the like. Also other pulsed sources of energy may be used, including mechanical energy such as acoustic waves, ultrasound, and the like.

Accordingly, the disclosed technique provides for manipulation of the sensitivity and image gain of a gated sensor, as a function of the imaged depth of field, by changing the width of the transmitted laser pulses, by changing the state of the sensor in a manner relating to the distance to the target, by adjusting the number of exposures in a gating cycle, by synchronization of the sensor to the pulse timing, and by other factors. Transmitted or emitted pulses, pulsed energy, pulsed beam and the like refer to at least one pulse, or to a beam of pulses emitted in series. The disclosed technique allows for dynamic imaging and information gathering in real-time. According to one embodiment, the optical observation system is mounted on a moving platform, for example, a vehicle, such as a military aircraft. The system then provides for the detection and identification of potential military targets in combat situations. A vehicle is only one example of a moving platform, whereas the latter may evidently include a non-vehicular moving platform as well (e.g. a camera dolly, or portable by a person). The disclosed technique is not limited to the embodiment of a moving platform, as the optical observation system may obviously be mounted on a stationary platform. According to another aspect of the disclosed technique, polarized light or electromagnetic radiation is employed, thereby providing for filtering out excessive ambient light of undesired reflections from background objects. Accordingly, the transmitting source emits a polarized pulse which reflects from the target objects as a polarized pulse reflection. A polarization filter or polarizer allows into a reflections sensor only incoming energy that conforms to the pulse reflections expected polarization. Most objects would reflect the original polarization of the emitted pulse but some reflective objects may alter such polarization.

Reference is now made to FIG. 1, which is a schematic illustration of the operation of a system, generally referenced 100, constructed and operative in accordance with an embodiment of the disclosed technique.

System 100 includes a laser device 102, and a sensor unit 104. Laser device 102 generates a laser beam 106 in the form of a single pulse or a series of continuous pulses. Laser device 102 emits laser beam 106 toward a target 108. Laser beam 106 illuminates target 108. Sensor unit 104 may be a camera, or any other sensor or light collecting apparatus.

Sensor unit 104 receives reflected laser beam 110 reflected from target 108. Sensor unit 104 includes at least one photodetector (not shown) for processing and converting received reflected light 110 into an image 112 of the target. Sensor unit 104 may also include an array of photodetectors. Sensor unit 104 may be in one of two states. During an "on" state, sensor unit 104 receives incoming light, whereas during an "off" state sensor unit 104 does not receive incoming light. In particular, the shutter (not shown) of sensor unit 104 is open during the "on" state and closed during the "off" state. The term "activated" is used herein to refer to the sensor being in the "on" state, whereas the term "deactivated" is used herein to refer to the sensor being in the "off" state. Image 112 may be presented on a display, such as a video or television display. The display may be a Head-Up Display (HUD), a Liquid Crystal Display (LCD), a display implemented with a planar optic apparatus, a holographic based flat optic display, and the like. Image 112 may also be stored on a storage unit (not shown), or transmitted by a transmission unit (not shown) to another location for processing. A controller (not shown) controls and synchronizes the operation of sensor unit 104. It is noted that sensor unit 104 can also be enabled to autogate. The term autogating refers to the automatic opening and closing of the sensor shutter according to the intensity of light received. Autogating is prevalently applied for purposes such as blocking exposure of the sensor unit to excessive light, and has no direct connection to active transmission of pulses, their timing, or their gating.

Atmospheric conditions and substances, such as humidity, haze, fog, mist, smoke, rain, airborne particles, and the like, represented by zone 114, exist in the surrounding area of system 100. Backscatter from the area in the immediate proximity to system 100 has a more significant influence on system 100 than backscatter from a further distanced area. For example, an interfering particle relatively close to system 100 will reflect back a larger portion of beam 106 than a similar particle located relatively further away from system 100. Accordingly, the area proximate to system 100 from which the avoidance of backscattered light is desirable can be defined with an approximate range designated as $R_{MIN}$. The target is not expected to be located within range $R_{MIN}$, therefore the removal of the influences of atmospheric conditions or other interfering substances in this range from the captured image is desirable. Such atmospheric conditions and substances can also be present beyond $R_{MIN}$, but their removal is both problematic and of lesser significance. These atmospheric conditions and substances interfere with laser beam 106 on its way to illuminating target 108, and with laser beam 110 reflected from target 108. Sensor unit 104 is deactivated for the duration of time that laser beam 106 has completely propagated a distance $R_{MIN}$ toward target 108 including the return path to sensor unit 104 from distance $R_{MIN}$. Range $R_{MIN}$ is the minimum range for which sensor unit 104 is deactivated. The distance between system 100 and target 108 is designated range $R_{MAX}$. It is noted that target 108 does not need to be located at a distance of range $R_{MAX}$, and can be located anywhere between range $R_{MIN}$ and range $R_{MAX}$. Range $R_{MAX}$ represents the maximal range in which target 108 is expected to be found, as the exact location of target 108 is not known when system 100 is initially used.

In order to clearly explain how the disclosed technique provides for the manipulation of the sensitivity and image gain of a gated sensor, it is useful to illustrate how a laser pulse propagates through space. It is also useful to illustrate how a laser pulse propagates towards, and reflects from, an object.

Figure 2A:
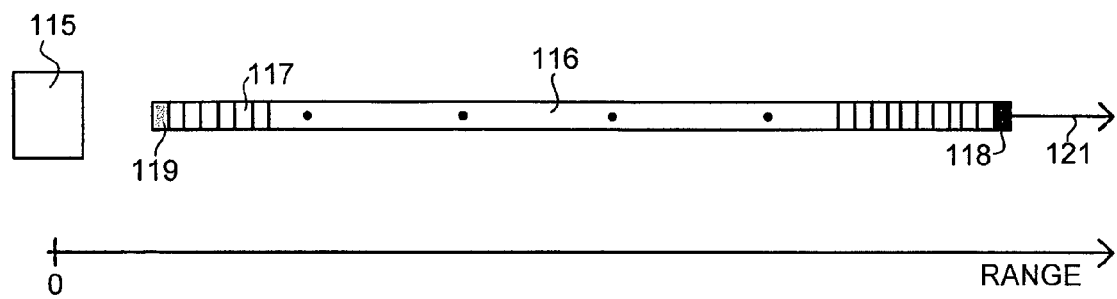
FIG. 2A is a schematic illustration of a laser pulse propagating through space.

Reference is now made to FIG. 2A, which is a schematic illustration of a laser pulse propagating through space. For the sake of simplicity, only classical mechanics considerations are applied in the following description. Laser pulse 116 emanates from laser device 115, and travels in the direction of arrow 121. Arrow 121 points towards an increase in range. Laser pulse 116 can be considered a train of small packets of energy 117, with each packet "connected" to the next, much like box cars of a real train are connected to one another. The first packet of energy of laser pulse 116 is referred to as head packet 118. The last packet of energy of laser pulse 116 is referred to as tail packet 119. Head packet 118 is coloured black and tail packet 119 is coloured gray for purposes of clarity only. Since laser pulse 116 is made up of small packets of energy 117, and each packet of energy, at a particular instant, is located at a particular point in space, then laser pulse 116 can be described as having a specified length, spanning from the location where tail packet 119 is located up to the location where head packet 118 is located. The front part of laser pulse 116, where head packet 118 is located, can therefore be referred to as the "head" of the laser pulse, and the back part of laser pulse 116, where tail packet 119 is located, can therefore be referred to as the "tail" of the laser pulse. Furthermore, the middle part of laser pulse 116, namely, the packets located between the head and the tail of the laser pulse, can be referred to as the "body" of the laser pulse. These definitions of the head and tail of a laser pulse will be herein referred to as such. The length of laser pulse 116 can also be described temporally, in terms of how much time laser device 115 is activated, in order to generate enough packets of energy, and to let the packets of energy propagate through space, to cover the range extended by laser pulse 116.

Figure 2B:
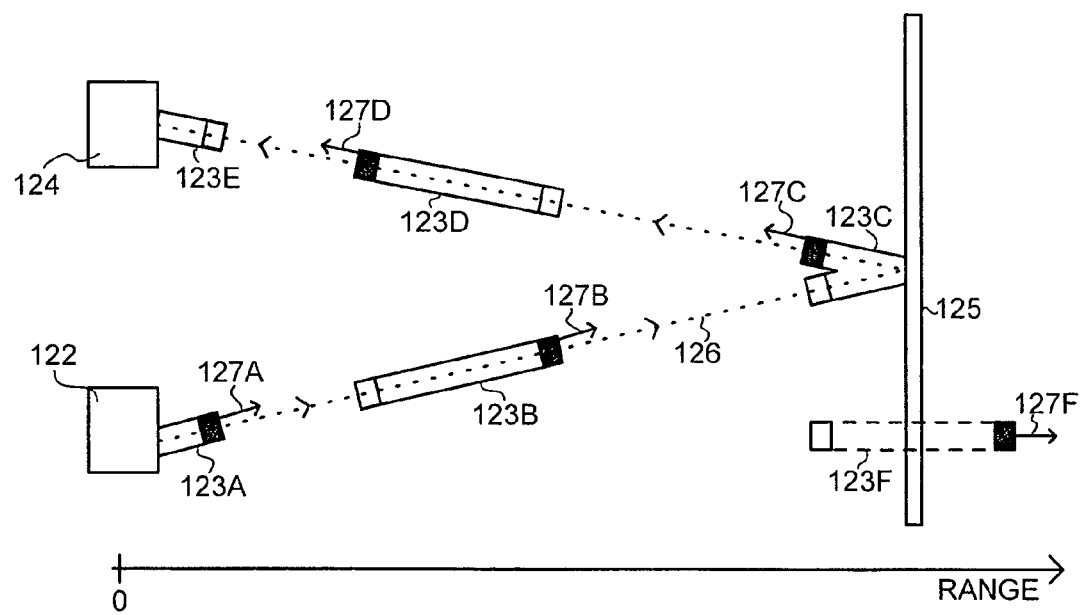
FIG. 2B is a schematic illustration of a laser pulse propagating towards, and reflecting from, an object.

Reference is now made to FIG. 2B, which is a schematic illustration of a laser pulse propagating towards, and reflecting from, an object. In FIG. 2B, laser pulses are emitted from laser device 122, and are received by sensor unit 124. FIG. 2B illustrates a particular instant in time when various laser pulses, emitted from laser device 122 at different times, are either, propagating towards object 125, reflecting from object 125, or passing object 125. Laser pulses propagating towards, and reflecting from, object 125, follow trajectory 126 and its direction. For the purposes of clarity only, the head of a laser pulse has been coloured black, and the tail of a laser pulse has been coloured gray.

At the particular instant in time illustrated in FIG. 2B, laser pulse 123A is still being generated, as only the head, and part of the body, of laser pulse 123A, has been generated. The tail, and the rest of the body, of laser pulse 123A has not yet been generated. Laser pulse 123A propagates in the direction of arrow 127A towards object 125. Laser pulse 123B is a full, or complete, laser pulse, which propagates in the direction of arrow 127B towards object 125. It is noted that laser pulse 123B has a head, tail and body. Laser pulse 123C has already partially impinged on object 125, as the head, as well as part of the body, of laser pulse 123C, has already impinged on object 125, and has begun to reflect back towards sensor unit 124, in the direction of arrow 127C. The tail, as well as part of the body, of laser pulse 123C, has not yet impinged on object 125, and is therefore still propagating away from laser device 122. It is noted that, regarding laser pulse 123C, the head portion of the laser pulse is propagating in a direction of decreased range, back towards sensor unit 124, while, simultaneously, the tail portion of the laser pulse is propagating in a direction of increased range, away from laser device 122. Laser pulse 123D is a full, or complete, laser pulse, which has completely impinged upon and reflected from object 125. Laser pulse 123D propagates in the direction of arrow 127D towards sensor unit 124. Laser pulse 123E has already been partially received by sensor unit 124, as only the tail, and part of the body, of laser pulse 123E is depicted in FIG. 2B. The head, and the rest of the body, of laser pulse 123E, has already been received by sensor unit 124.

Laser pulse 123F is a full, or complete, laser pulse which did not reflect from object 125, and propagates in the direction of arrow 127F. The head, as well as part of the body, of laser pulse 123F, has already passed object 125. The tail, as well as part of the body, of laser pulse 123F, has not yet passed object 125. It is noted that laser pulse 123F was emitted at the same time laser pulse 123C was emitted. It is furthermore noted that not all the laser pulses emitted from laser device 122 will reflect from the same object or location, for example laser pulse 123C as compared to laser pulse 123F. In general, laser device 122 will emit many laser pulses, in order to illuminate an area, as it is not known in advance which objects in the path of the laser pulses will reflect the laser pulses back towards a sensor unit, and how many reflections will be received from the various ranges the laser pulses propagate through.

Figure 3:
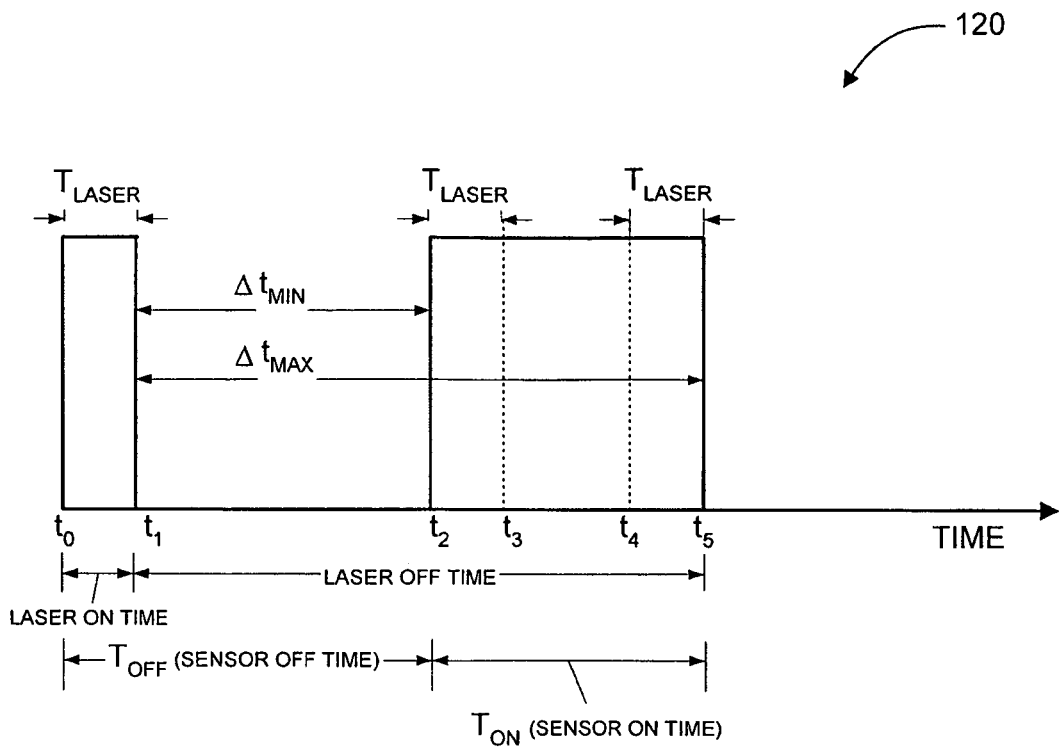
FIG. 3 is a graph depicting gated imaging of both a laser and a sensor as a function of time.

Reference is now made to FIG. 3, which is a graph, generally designated 120, depicting gated imaging as a function of time, of both a laser and a sensor. In graph 120, a laser pulse is transmitted at time $t_0$. The duration of the laser pulse, or the pulse width of the laser beam (in other words, the time the laser is on), is designated $T_{LASER}$, and extends between time $t_0$ and time $t_1$. Between time $t_1$ and time $t_5$, there is no transmission of a laser pulse, depicted in FIG. 3 by arrows demarcating a laser off time. It is noted that the description herein refers to a square pulse for the sake of simplicity and clarity. It is further noted that the description herein is equally applicable to a general pulse shape or pattern, in which threshold values define the effective beginning, duration and end of the pulse, rendering its analysis analogous. The sensor unit is initially in the "off" state for as long as the laser pulse is emitted, between time $t_0$ and time $t_1$ ($T_{LASER}$). The sensor unit is further maintained in the "off" state between time $t_1$ and time $t_2$, or during time span $\Delta t_{MIN}$. The sensor unit remains in the "off" state so as not to receive reflections of the entire laser pulse (including the end portion of the pulse) from objects located within a range $R_{MIN}$ from the system. As depicted in FIG. 3, $T_{OFF}$, the time the sensor unit is in an "off" state, extends from time $t_0$ to time $t_2$. At time $t_2$, the sensor unit is activated and begins receiving reflections. The reflections from objects located immediately after range $R_{MIN}$ from the system are received from photons at the rear end of the transmitted pulses which have impinged on these objects. The front portion of the transmitted pulses is not detected for these objects located immediately after range $R_{MIN}$. At time $t_3$, the sensor unit first receives reflections from the entire width of the pulses. The range of the objects, for which the entire width of the pulse is first received, is designated $R_0$. Thus the time span between time $t_2$ and time $t_3$ is equal to $T_{LASER}$. The sensor unit remains in the "on" state until time $t_5$. As depicted in FIG. 3, $T_{ON}$, the time the sensor unit is in an "on" state, extends from time $t_2$ to time $t_5$. At time $t_4$, the sensor unit still receives the full reflection of the pulses from objects located up to a range designated $R_1$. Reflections from objects beyond this range reflect progressively less portions of the laser pulse. The tail portion of the reflected pulse is cut off to a greater extent, as the sensor shifts from its "on" state to its "off" state, the further away such objects are located beyond $R_0$ up to a maximal range designated $R_{MAX}$. $R_{MAX}$ is the range beyond which no reflections are received at all, due to the deactivation of the sensor to its "off" state. At time $t_5$, corresponding to receiving reflections from objects at $R_{MAX}$ the sensor unit receives reflections only from photons at the very front end of pulses whose tails are just about to pass range $R_1$. Thus the time span between time $t_4$ and time $t_5$ is equal to $T_{LASER}$. Time span $\Delta t_{MAX}$ corresponds to the time it takes a laser pulse, once it has been fully transmitted, to reach objects located at $R_{MAX}$.

Figure 4:
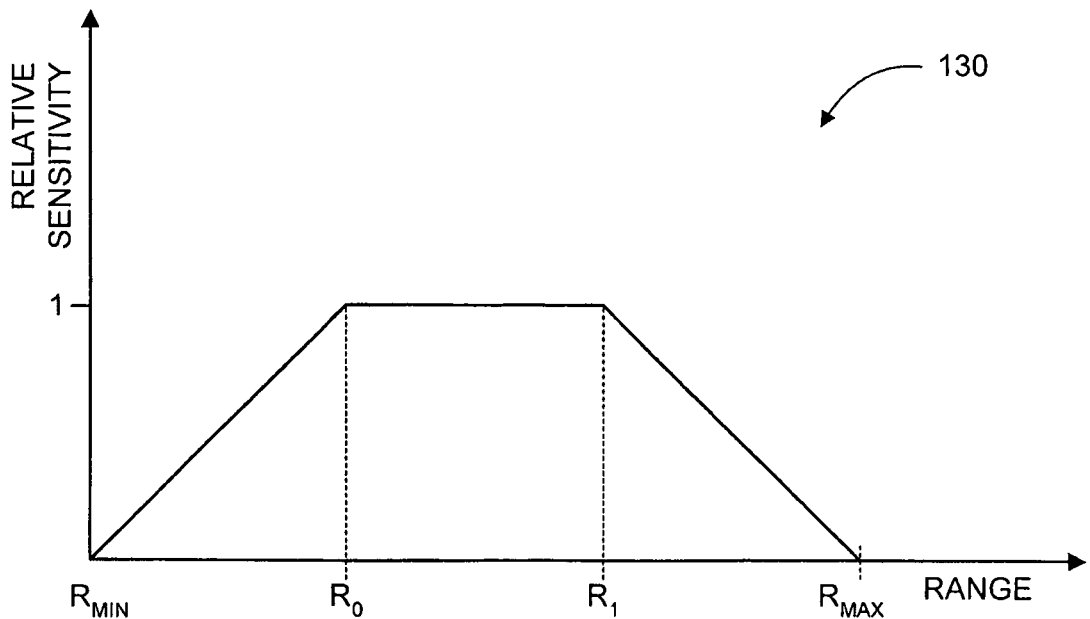
FIG. 4 is a typical sensitivity graph, normalized to 1, depicting sensitivity of a gated sensor as a function of the range between the sensor and a target.

Reference is now made to FIG. 4, which is a typical sensitivity graph, generally designated 130, depicting the sensitivity of the sensor unit, referred to in FIG. 1, as a function of the range between the sensor unit and a target area. The vertical axis represents the relative sensitivity of the sensor unit, and has been normalized to 1. The horizontal axis represents the range between the sensor unit and a target. The term "sensitivity", referred to in this context, relates to the gain or responsiveness of the sensor unit in proportion to the number of reflected photons actually reaching the sensor unit when it is active, and not to any variation in the performance of the sensor, per se. Variation in the performance of the sensor has no relation to the range from which light is reflected, if the attenuation of light, due to geometrical and atmospheric considerations, is ignored. The attenuation of light due to geometrical and atmospheric considerations is ignored herein for the sake of simplicity. Accordingly, the amount of received energy of the pulse reflections, reflected from objects located beyond a minimal range $R_{MIN}$, progressively increases with the range along the depth of a field to be imaged.

Range $R_{MIN}$ is the range up to which the full reflections from a target at this range will impinge upon sensor unit 104, referred to in FIG. 1, in a deactivated state. With reference to FIG. 3, range $R_{MIN}$ corresponds to the time duration between time $t_0$ and time $t_2$. Range $R_0$ is the range from which full reflections first arrive at sensor unit 104 while it is activated. The reflections are the consequence of the whole span of the pulse width passing in its entirety over a target located at range $R_0$ from sensor unit 104. With reference to FIG. 3, the distance between range $R_{MIN}$ and range $R_0$ corresponds to the time duration between time $t_2$ and time $t_3$. Range $R_1$ is the range up to which full reflections from objects can still be obtained. With reference to FIG. 3, the distance between range $R_0$ and range $R_1$ corresponds to the time duration between time $t_3$ and time $t_4$. Range $R_{MAX}$ is the range for which reflections, or any portion thereof, can still be obtained, i.e. the maximum range for which sensor sensitivity is high enough for detection. With reference to FIG. 3, the distance between range $R_1$ and range $R_{MAX}$ corresponds to the time duration between time $t_4$ and time $t_5$. It is noted that reflections from objects located beyond $R_{MAX}$ may also be received by sensor unit 104, if such targets are highly reflective. Incoming radiation from objects located at any distance, including distances beyond $R_{MAX}$, for example, stars, may also be received by sensor unit 104, if such objects emit radiation at a wavelength detectable by sensor unit 104.

In graph 130, in the region ranging from range $R_{MIN}$ up to range $R_0$ the sensitivity of the sensor unit gradually increases to a maximum level of sensitivity. This region includes reflected light mainly from atmospheric sources that cause interference and self-blinding in the sensor unit, therefore a high sensitivity is undesirable in this region. In general, the sensor unit initially encounters the photons of a reflected light beam at the very front end of the transmitted laser pulse, then the photons in the middle of the pulse and finally the photons at the very end of the pulse. In the region ranging from range $R_{MIN}$ up to range $R_0$, the sensor doesn't detect most of the front portion of the pulses reflected from objects just beyond $R_{MIN}$, because of the timing of the "on" state of the sensor. In the region ranging from range $R_{MIN}$ up to range $R_0$, the sensor incrementally detects more and more of the pulse as it reflects from objects found in further ranges. This incremental detection continues until all of the pulse is received for objects located at $R_0$. Thus, the duration of the incline in graph 130 is equivalent to the width of the laser pulse $T_{LASER}$. The sensor unit remains at maximum sensitivity between range $R_0$ and range $R_1$. This is the region where targets are most likely to be located, so a high sensitivity is desirable. The sensitivity of the sensor unit progressively gradually decreases to a negligible level beyond range $R_1$. In particular, for objects located immediately after range $R_1$, the sensor unit begins to not detect the photons at the very end of the laser pulse, then for further ranges the photons in the middle of the pulse are also not detected, and finally for objects located at $R_{MAX}$, the photons at the front end of the pulse are not detected, until no photons are received at all. The duration of the decline in graph 130 is equivalent to the width of the laser pulse $T_{LASER}$. It is noted that the sensitivity depicted in FIG. 4 enables sensor unit 104, and in general, system 100, referred to in FIG. 1, to obtain a level of received light energy, in system 100, which is directly proportional to the ranges of targets.

A particular sensitivity as a function of range may be obtained by system 100, referred to in FIG. 1, by the application of several techniques, either individually or in various combinations. These techniques will now be discussed.

Figure 5:
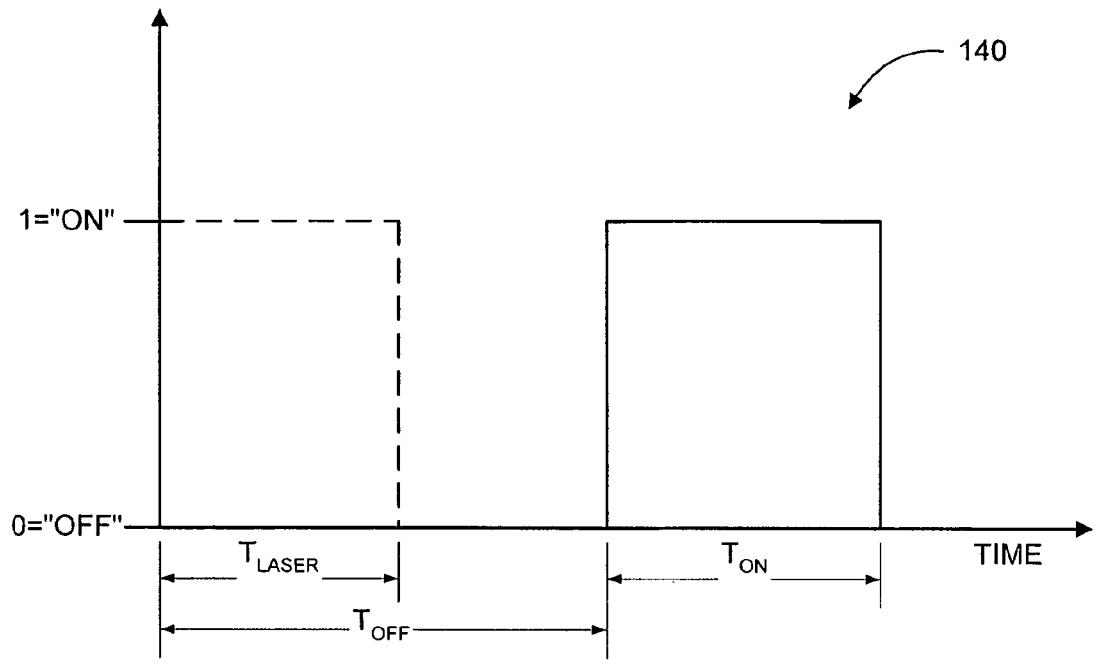
FIG. 5 is a graph depicting timing adjustments relating to the pulse width of a laser beam, as a function of time.

Reference is now made to FIG. 5, which is a graph, generally designated 140, depicting timing adjustments relating to the pulse width of the laser beam. The technique relates to the time sensor unit 104, referred to in FIG. 1, is activated with respect to the pulse width of laser beam 106, referred to in FIG. 1. The vertical axis represents the status of a device, such as a laser or a sensor unit, where '1' represents a status of a device being on, and '0' represents a status of the device being off. The horizontal axis represents time.

Time $T_{OFF}$ is the time during which sensor unit 104 is deactivated, immediately after transmitting laser pulse 106. Time $T_{OFF}$ may be determined in accordance with the range from which reflections are not desired ($R_{MIN}$), thereby preventing reflections from atmospheric conditions and substances, and the self-blinding effect. In particular, $T_{OFF}$ may be determined as twice this range divided by the speed of light, in the medium it is traveling in (v), as this is the time span it takes the last photon of the laser pulse to reach the farthest point in the range $R_{MIN}$ and reflect back to the sensor. It may be desirable to lengthen the duration of time the sensor unit is deactivated by the duration of the pulse width of the laser beam, to ensure that no backscattered reflections from the area up to $R_{MIN}$ are received in sensor unit 104. Therefore, $T_{OFF}$ can be calculated using the following equation:

$$T_{OFF} = \frac{2 \times R_{MIN}}{v} + T_{LASER} \quad (1)$$

Time $T_{ON}$ is the time during which sensor unit 104 is activated and receives reflections from a remote target 108, referred to in FIG. 1. Time $T_{ON}$ may be determined in accordance with the entire distance the last photon of a pulse that propagates up to $R_0$ and back to the sensor unit. Since the sensor unit is activated at time $2 \times R_{MIN}/v$, after laser pulse 106 has been fully emitted, the last photon of the laser pulse is already distanced $2 \times R_{MIN}$ from the sensor unit. The last photon will propagate a further distance of $R_0 - (2 \times R_{MIN})$ until target 108, and a further distance $R_0$ back to the sensor, summing up to $2 \times (R_0 - R_{MIN})$. The time it takes to scan this range can be calculated by dividing the range by the speed of light, in the medium it is traveling in. Therefore, $T_{ON}$ can be calculated using the equation:

$$T_{ON} = \frac{2 \times (R_0 - R_{MIN})}{v} \quad (2)$$

It is noted that the aforementioned calculations serve to substantially define the time variables. The final values for these variables can be further refined or customized in accordance with certain factors related to system 100, referred to in FIG. 1. Such refinements or customizations will be elaborated upon hereafter, and may include, for example, accounting for specific environmental conditions, the speed of a moving platform (if system 100 is mounted on the moving platform, such as a vehicle), the specific characteristics of targets expected to be located at certain ranges, changing the form of laser pulse 106 and the like.

Figure 6:
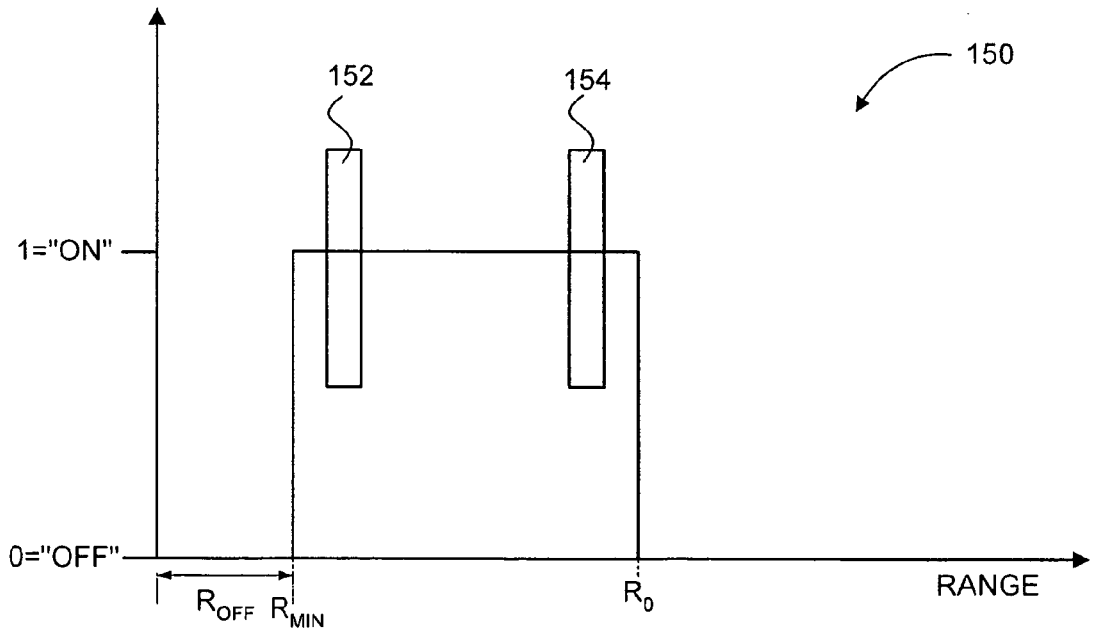
FIG. 6 is a graph depicting the observation capability of a system with the timing technique depicted in FIG. 5, as a function of range.

Reference is now made to FIG. 6, which is a graph, generally designated 150, depicting the observation capability of a system with the timing technique depicted in FIG. 5. The vertical axis represents the status of the laser beam, where '1' represents a status of the laser beam being on, and '0' represents a status of the laser beam being off. The horizontal axis represents distance.

Sensor unit 104, referred to in FIG. 1, is "blind" up to range $R_{MIN}$. In particular, there are no received reflections, generated by laser pulse 106, referred to in FIG. 1, from objects located in the region immediately beyond system 100, referred to in FIG. 1, up to range $R_{MIN}$. The range in which sensor unit 104 is "blind" is demarcated by arrows in FIG. 6 as $R_{OFF}$. This blinding is due to the fact that laser pulse 106 propagates throughout path $R_{MIN}$ while system 100 is blind to reflections generated by laser pulse 106 colliding with any object throughout this range, sensor unit 104 having been deactivated during this period. Thus, $R_{MIN}$ is the minimum range for which reflections, in their entirety, may encounter sensor unit 104 in the "off" state.

Element 152 is an object to be detected, located somewhat beyond range $R_{MIN}$. Element 154 is an object to be detected, located further away, slightly before range $R_0$. To understand how sensitivity as a function of range is achieved, it is helpful to examine how reflections are received from objects located at the range between $R_{MIN}$ and $R_0$.

Figure 7:
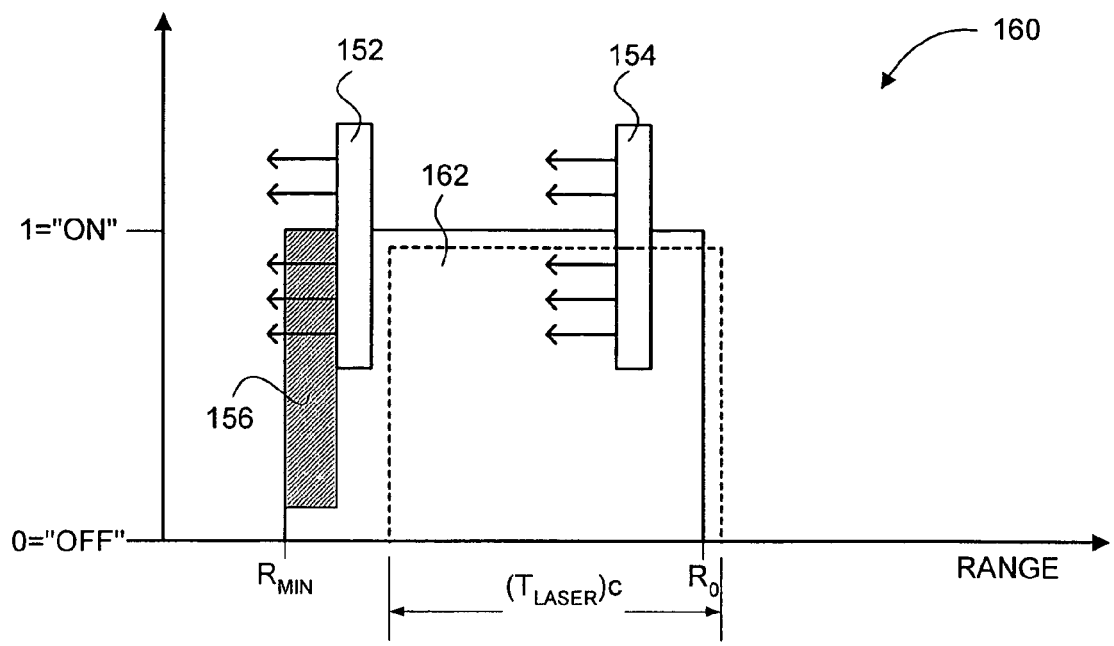
FIG. 7 is a graph depicting a specific instant in time in relation to the scenario depicted in FIG. 6, as a function of range.

Reference is now made to FIG. 7, which is a graph, generally designated 160, depicting a specific instant in time in relation to the scenario depicted in FIG. 6. In particular, graph 160 depicts the specific instant at which laser pulse 162 has just completed passing element 152 and continues advancing. The vertical axis represents the status of the laser beam, where '1' represents a status of the laser beam being on, and '0' represents a status of the laser beam being off. The horizontal axis represents distance.

Reflections from element 152 may be received the moment sensor unit 104, referred to in FIG. 1, is activated, even before the entire pulse width of laser pulse 162 has passed element 154. Therefore, plenty of time is provided for sensor unit 104 to receive reflections that can be intensified from object 154, but only a limited intensifying time is provided for reflections from the closer element 152.

Sensor unit 104 may be activated just a short time before the last portion of pulse energy 162 is reflected from element 152, provided that laser beam 106, referred to in FIG. 1, remains on element 152. This portion is proportional to the small distance between $R_{MIN}$ and element 152. This portion is represented by hatched element 156. Sensor unit 104 is activated only when the tail portion, hatched element 156, of a part of laser pulse 162, reflects from element 152. Immediately afterwards, energy is also reflected continuously from element 154, which is being passed by advancing laser pulse 162, also in proportion to the greater distance between $R_{MIN}$ and element 154.

Consequently, the total energy received by sensor unit 104 as a consequence of reflections from element 152 is relative to the duration of time during which laser pulse 162 fully passes element 152, and still manages to reflect to a sensor unit, while the sensor unit is in the "on" state.

Figure 8:
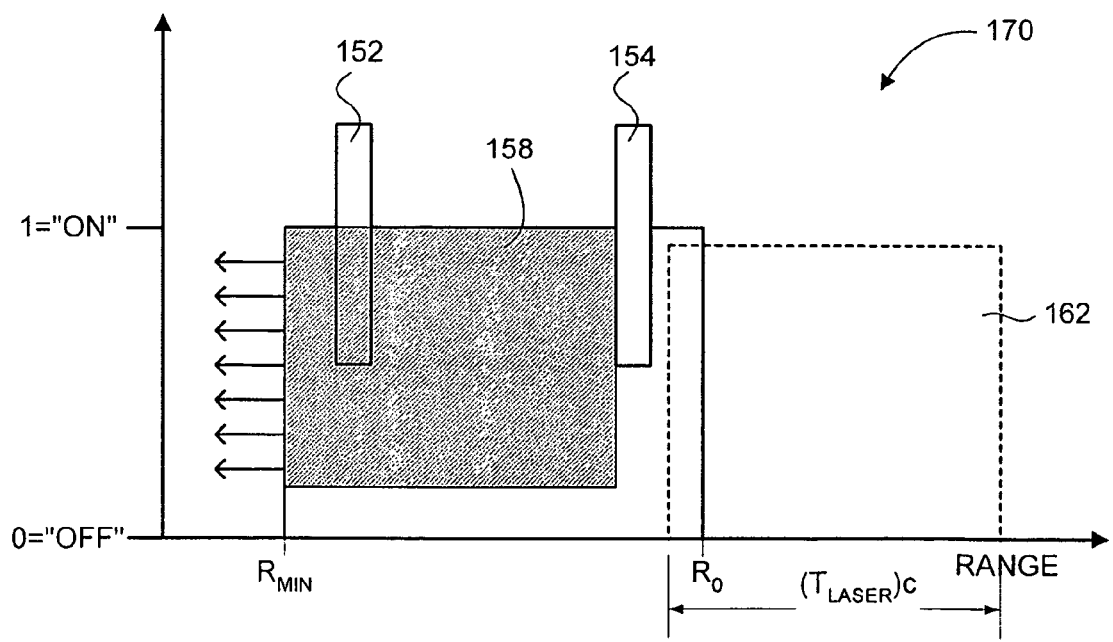
FIG. 8 is a graph depicting a specific instant in time after the specific time instant depicted in FIG. 7, as a function of range.

Reference is now made to FIG. 8, which is a graph, generally designated 170, depicting a specific instant in time after the instant depicted in FIG. 7. In particular, graph 170 depicts the specific instant at which laser pulse 162 has just completed passing element 154 and continues advancing. The vertical axis represents the status of the laser beam, where '1' represents a status of the laser beam being on, and '0' represents a status of the laser beam being off. The horizontal axis represents distance.

At this instant, reflections from element 154 may be received by sensor unit 104, referred to in FIG. 1, as long as laser beam 106 remains incident on element 154. Reflections are no longer received from element 152, as laser pulse 162 has already passed element 152 and any reflections from element 152 have already passed sensor unit 104 in their entirety. Consequently, the reflection intensity absorbed from element 154, located near range $R_0$, may be substantially greater than the reflection intensity absorbed from element 152. This difference in absorbed reflection intensity is because the received reflection intensity is determined according to the period during which sensor unit 104 is activated while the element is reflecting thereto. This means that laser pulse 162 may remain incident on element 154 for a longer time than on element 152, during a period that sensor unit 104 is activated, and receiving reflections. When sensor unit 104 is activated, the head and tail portions, hatched element 158, of a part of laser pulse 162, reflect from element 154. In such a case, sensor unit 104 receives more energy from an object near the optimal range $R_0$ than from an object closer to system 100, referred to in FIG. 1, for example, an object located slightly beyond range $R_{MIN}$.

Figure 9:
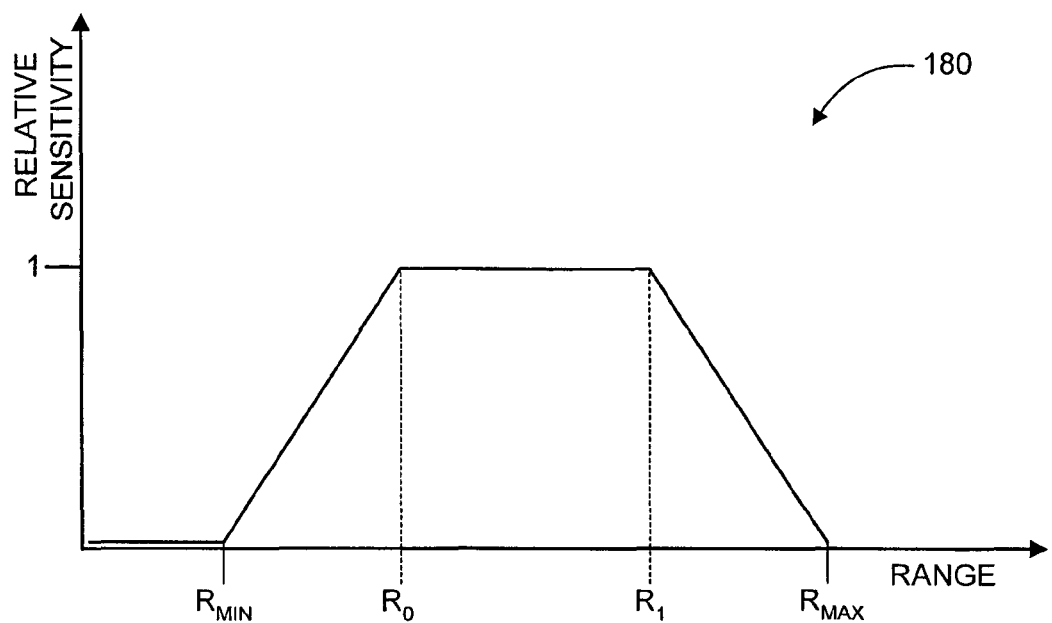
FIG. 9 is a sensitivity graph as a function of range, normalized to 1, depicting the sensitivity of a gated sensor, in accordance with the timing technique depicted in FIG. 5.

Reference is now made to FIG. 9, which is a sensitivity graph, generally designated 180, in accordance with the timing technique depicted in FIG. 5, depicting the sensitivity of a gated sensor. The vertical axis represents relative sensitivity, and the horizontal axis represents distance. The vertical axis has been normalized to 1.

During time $T_{OFF}$, referred to in FIG. 5, sensor unit 104, referred to in FIG. 1, does not receive any reflections. Time $T_{OFF}$ corresponds to range $R_{MIN}$. At range $R_{MIN}$, sensor unit 104 is activated. Between ranges $R_{MIN}$ and $R_0$, the sensitivity of sensor unit 104 increases because increasingly more portions of laser pulse 106, referred to in FIG. 1, reflected from objects located between $R_{MIN}$ and $R_0$, are received by sensor unit 104. Between ranges $R_0$ and $R_1$, sensor unit 104 receives pulse reflections, in their entirety, from objects located between $R_0$ and $R_1$. Between ranges $R_1$ and $R_{MAX}$, the sensitivity of sensor unit 104 decreases because increasingly less portions of laser pulse 106, reflected from objects located between $R_1$ and $R_{MAX}$, are received by sensor unit 104. At range $R_{MAX}$, sensor unit 104 is deactivated, and no portions of laser pulse 106 are received in sensor unit 104. Time $T_{ON}$, referred to in FIG. 5, corresponds to the distance between ranges $R_{MIN}$ and $R_{MAX}$.

It is noted that graph 180 may not be ideal, because laser pulse 106 may also illuminate elements, especially highly reflective elements, located beyond range $R_{MAX}$, as laser pulse 106 gradually dissipates. Furthermore, graph 180 may not be ideal because the sensitivity remains constant between the first optimum range $R_0$ and the last optimum range $R_1$, even though further attenuation exists within the range span $R_1$-$R_0$. It is possible to reduce the sensitivity of system 100, referred to in FIG. 1, for receiving reflections originating from beyond range $R_0$ by other techniques. Such techniques include changing the form or shape of the pulses of laser beam 106, changing the pattern of the pulses of laser beam 106, changing the energy of the pulses of laser beam 106, changing the time that sensor unit 104 is activated, and changing the width of laser pulse 106. These techniques are now discussed.

Figure 10:
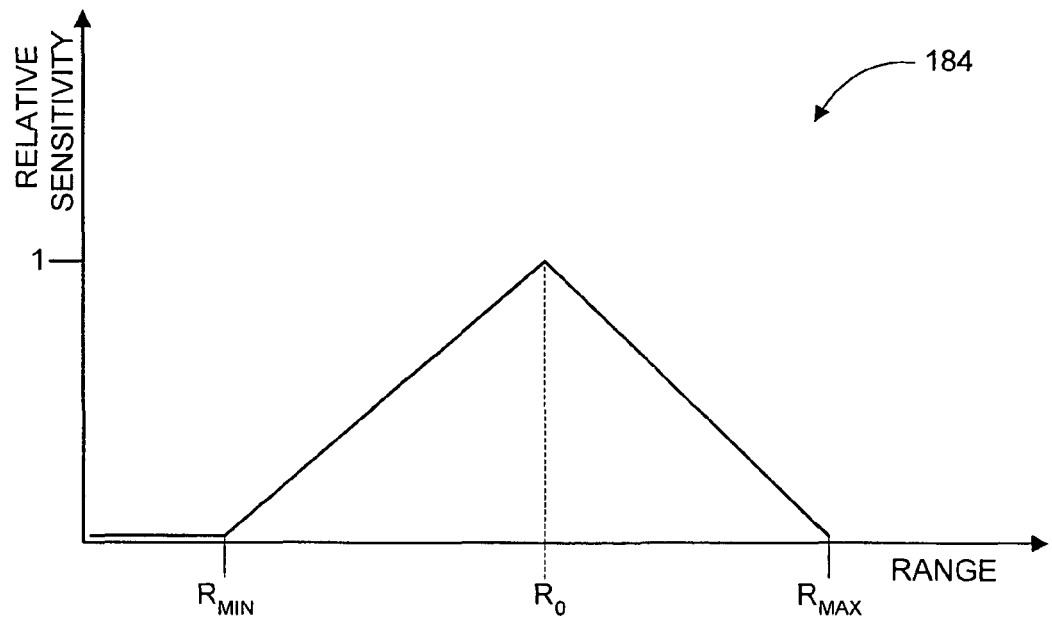
FIG. 10 is a sensitivity graph as a function of range, normalized to 1, depicting the sensitivity of a gated sensor, in accordance with a long pulse gated imaging timing technique.

Reference is now made to FIG. 10, which is a sensitivity graph, generally designated 184, in accordance with a Long Pulse Gated Imaging (LPGI) timing technique, depicting the sensitivity of a gated sensor. The vertical axis represents relative sensitivity, while the horizontal axis represents distance. The vertical axis has been normalized to 1.

In the LPGI timing technique, the pulse width of the laser beam, $T_{LASER}$ is set equal to the difference between the time required for the laser beam to traverse the path from the system to the minimal target distance and back ($2 \cdot R_{MIN}/v$) and the time the last photon reflects back from a target located at range $R_1$, referred to in FIG. 9. This time is also equivalent to the duration of time for which a sensor unit is activated, $T_{ON}$. Thus, both $T_{LASER}$ and $T_{ON}$ are given by the relation:

$$\frac{2 \times (R_{MAX} - R_{MIN})}{v} \tag{3}$$

where v is the speed of light, in the medium it is traveling in. It is noted that LPGI may be considered a particular example of the timing techniques depicted in graphs 140, 150, 160, 170 and 180, in which $R_0 = R_1$. The LPGI timing technique is particularly suited for cases where a large dynamic range, for example from 3 to 30 kilometers, needs to be imaged.

By way of an example, if a target is located at a distance of 25 km away from system 100 (FIG. 1), meaning $R_1$ is equal to 25 km, and if $R_{MIN}$ is equal to 3 km, and the speed of light is equal to c, the speed of light in a vacuum, then $T_{ON}$ and $T_{LASER}$ will substantially equal:

$$\frac{2 \times (25 \text{ km} - 3 \text{ km})}{c} = 146.7 \text{ μsec}.$$

From the instant that laser beam 106, referred to in FIG. 1, is transmitted, the sensor unit operates in an LPGI mode, meaning $T_{ON}$ will be equal in duration to $T_{LASER}$. To eliminate backscattered light without loss of contrast while maintaining a high quality image of a target and the background, it is sufficient to switch the sensor unit to the "off" state when the reflected beam has traversed approximately 6 km (3 km each way to and from range $R_{MIN}$). It is noted that it may be desirable to lengthen time $T_{OFF}$ by the pulse width of the laser beam, $T_{LASER}$, to ensure that no backscattered reflections from the area up to $R_{MIN}$ are received by the sensor unit. Therefore, the actual time $T_{OFF}$ is given by the following equation:

$$T_{OFF} = \frac{2 \times R_{MIN}}{v} + T_{LASER} \tag{4}$$

In the particular case of LGPI, $T_{LASER}$ is given by the following equation:

$$T_{LASER} = \frac{2 \times (R_{MAX} - R_{MIN})}{v} \tag{5}$$

Using equations 4 and 5, $T_{OFF}$ may be simplified to:

$$T_{OFF} = \frac{2 \times R_{MAX}}{v} \tag{6}$$

Reference is now made to FIG. 11, which is a graph, generally designated 185, depicting the radiant intensity captured by a sensor unit from reflections from a target and from backscatter, as a function of the range between the sensor unit and the target, for both gated and non-gated imaging, during a simulation. Graph 185 is based on a simulation of a typical airborne system in the conditions specified at the bottom of FIG. 11. The vertical axis represents radiant intensity logarithmically, in units of lumens per square meter. The horizontal axis represents range, in units of kilometers.

Curve 186 represents the radiant intensity captured by the sensor unit from the residual light intensity dispersed as light reflexes from the target, for a system operating in an LPGI mode. Curve 187 represents the radiant intensity captured by the sensor unit from backscatter as the laser beam deflects off of atmospheric substances, for a system operating in an LPGI mode. Similar curves, 188 and 189, correspondingly, are provided in graph 185, for a system operating in a non-gated mode. It is noted that the form of radiant intensity curve 188 from light reflected from the target in a non-gated mode is given, in general, by the inverse square law of light attenuation, in vacuum, as:

$$\frac{1}{r^2} \tag{7}$$

where r is the distance between the source and the target. This law is governed by the geometric propagation of a light beam from a source to a target, and accounts for energy attenuation over distance. The light beams propagate through a mainly homogenous medium, and through an atmosphere with an aerosol density profile typical of an elevation above sea level. It is further noted that for curves 186 and 187, both operating in an LPGI mode, no radiant intensity is detected up until 3 km, which in FIG. 11 represents $R_{MIN}$, the minimal range, referred to in FIG. 1.

It is noted that in an LPGI mode, the radiant intensity from backscatter (curve 187) is negligible relative to the effective radiant intensity of the reflection of light impinging on the surface of a target (curve 186). This is the case for the entire range between 3 km and 25 km. On the other hand, when the system is operating in a non-gated mode, the intensity from backscatter (curve 189) is even higher than the effective intensity of the reflected light from the surface of the target (curve 188). This is the case from the range of 2 km and over. The difference between target and backscatter is lower in a gated mode by up to several orders of magnitude than in a non-gated mode, over equivalent ranges.

Therefore, it is appreciated that LPGI operation improves the contrast of the illuminated target against the backscatter light intensity for any range between 3 km and 25 km. Thus, a system operating in an LPGI mode does not require knowledge of the exact range to a target. With reference to FIG. 1, system 100 does not require knowledge of the exact range $R_0$ between system 100 and target 108 (FIG. 1). A rough estimation of range $R_0$ is sufficient in order to calculate the required pulse width of laser beam 106 (FIG. 1). Such an estimation can extend, in the example of FIG. 11, between 3 to 25 km, which is particularly broad and requires a very rough estimation in comparison to the precise range determination required for modes other than the LPGI operation mode.

It is further noted that in an LPGI mode, the radiant intensity of the reflection of light from a target changes by less than a factor of ten over the 4 km to 20 km range. In contrast, in a non-gated mode, the radiant intensity of the reflection of light from the target varies by a factor of one hundred over the same range. The relative "flatness" of curve 186 is the result of the gradual increase of sensitivity gain of a gated sensor unit, in proportion to the increase of range, represented in the graph of FIG. 10 between $R_{MIN}$ and $R_0$. This gradual or progressive increase of sensitivity is "multiplied" by the attenuation of reflected light in the inverse relation ($1/r^2$), in vacuum, proportional to the increase in the range, represented by curve 188 in FIG. 11, resulting in the relatively "flat" curve 186. The range of 4 km to 20 km between a sensor unit and a target is typical for many applications, particularly military targeting.

It is therefore appreciated that a system operating in an LPGI mode provides effective observation (i.e. identification and detection) of targets over a versatile depth of field. "Depth of field" refers to the ranges of view confined to certain limits. With reference to FIG. 1, system 100 will produce a high quality image for both targets located relatively near system 100 (beyond $R_{MIN}$) and targets located relatively far away from system 100 (close to $R_0$).

The property of versatile depth of field responsiveness is highly relevant in the context of a television or video image having a relatively low inherent intra-scene dynamic range. This property prevents self-blinding and overexposure of nearby objects in the image, which occurs when using auxiliary information without the gated imaging feature. Self-blinding and overexposure are prevented because no reflected light is observed up to the minimal range (for example, referring to FIG. 10, if $R_{MIN}$=3 km). Self-blinding and overexposure are also prevented because the difference in observed intensities between nearby and faraway objects is relatively small (a substantially flat curve for the gated target radiant intensity in graph 185).

The total irradiance Ir(R) received by a sensor unit as a function of range R is given by the following convolution formula:

$$I_r(R) = \frac{\int_{T_{LASER}+T_{OFF}}^{T_{LASER}+T_{OFF}+T_{ON}} L\left(t - \frac{2R}{v}\right) \cdot C(t) dt}{T_{LASER}} \quad (8)$$

where L(t) is a Boolean function representing the existing reflection of a laser pulse, irrespective of the on/off state of the sensor. L(t)=1 if the laser is "on" (i.e. the laser pulse exists over that range) and L(t)=0 if the laser is "off" (i.e. the laser pulse does not exist over that range). C(t) is a Boolean function representing the ability of the sensor to receive incoming light according to the on/off state of the sensor. C(t)=1 if the sensor unit is in the "on" or activated state, and C(t)=0 if the senor unit is in the "off" or deactivated state. $T_{LASER}$, $T_{ON}$ and $T_{OFF}$ are as they were defined above (where $T_{OFF}$ is the time a sensor unit has been deactivated immediately following the completion of transmission of a laser pulse). v represents the speed at which the laser pulse travels, in the medium in which it is traveling in.

The integral is divided by $T_{LASER}$ to normalize the result. The values for radiant intensity (e.g. the curves in graph 185) may be obtained by multiplying the above convolution formula with a rough geometrical propagation attenuation function of a laser pulse, such as $$\frac{1}{r^2}$$

mentioned above, or a more accurate attenuation function that takes into account atmospheric absorption and scattering interferences, such as $$\frac{1}{r^2} e^{-2\gamma r},$$

where 'γ' is the atmospheric attenuation constant. The 'γr' in the power of the natural exponent 'e' is multiplied by '2' because the attenuation function of the laser pulse takes into account the distance covered by the laser pulse to and from a target.

Figure 12:
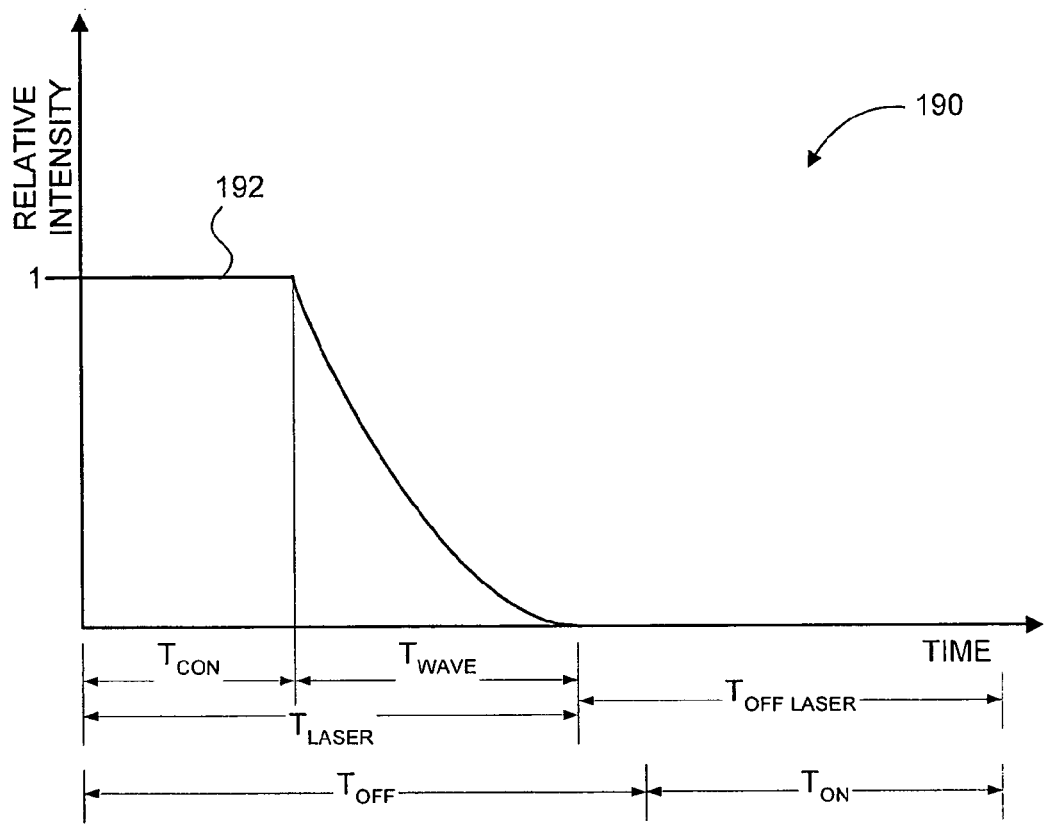
FIG. 12 is an intensity graph as a function of time, normalized to 1, depicting adjustment of the intensity shape or pattern of a laser pulse.
Figure 13:
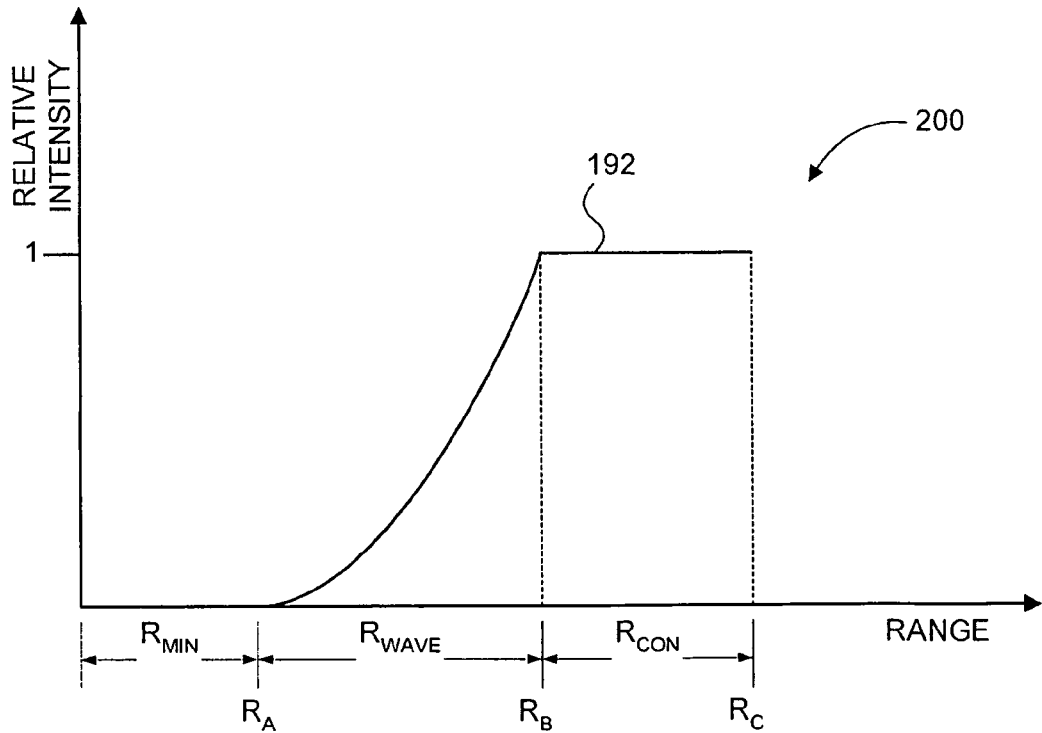
FIG. 13 is an intensity graph as a function of range, normalized to 1, depicting the advancement of the intensity shaped or patterned laser pulse depicted in FIG. 12.
Figure 14:
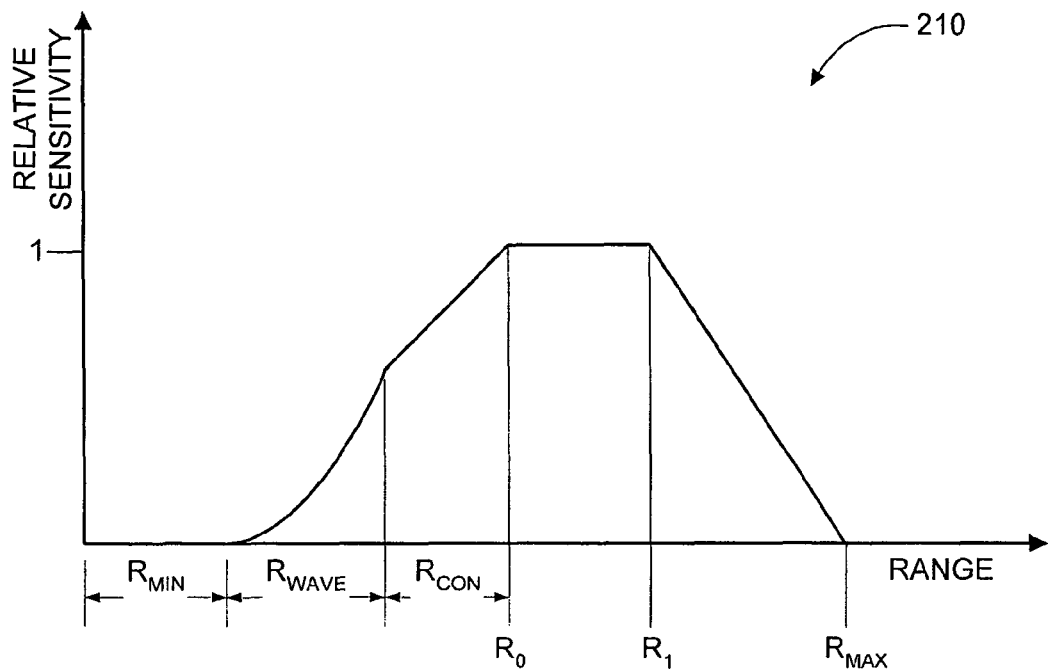
FIG. 14 is a sensitivity graph as a function of range, normalized to 1, depicting the sensitivity of a gated sensor, in accordance with the laser shaping technique depicted in FIG. 12.

Reference is now made to FIGS. 12-14. These graphs depict a technique according to which laser pulse 106 (FIG. 1) is generated with a specific shape (of each pulse) or pattern (of pulses in a beam). Also the pulse energy of the pulses may be varied for similar purposes. These techniques illustrate the ability to change (preferably—progressively or gradually) the gradient shape of laser pulse 106 in order to achieve maximum sensitivity of system 100 (FIG. 1) at optimal range $R_0$. In accordance with graphs 150, 160 and 170, if a shaped or patterned laser pulse is generated, a substantially small number of photons of laser pulse 106 reflected from element 152 (located near system 100) and a substantially large number of photons of laser pulse 106 reflected from element 154 (located remote from system 100) may be received by sensor unit 104 (FIG. 1). For example, if the form (i.e. shape or pattern) of laser pulse 106 is selected such that the intensity is higher at the end of the pulse than at the beginning, then more light from laser pulse 106, reflected from element 152, may be received in sensor unit 104, than light reflected from element 154. This would be true if the gating of sensor unit 104 is synchronized to start receiving reflections when the head of a reflected pulse from $R_{MIN}$ reaches sensor unit 104, and to stop receiving reflections when the tail of the reflected pulse from $R_{MIN}$ reaches sensor unit 104. For analogous purposes, the energy of emitted pulses, and the synchronization of sensor unit 104, may be selected, such that pulses, to be reflected from objects located at greater distances, will be received in sensor unit 104 with higher intensity (while similar shape or pattern may be retained). The pulse reflections will correspondingly cause greater energy to be received as the reflecting objects are farther distanced, thus partially, fully, or even excessively compensating for the energy attenuation that increases with the reflection distance.

FIG. 12 is a graph, generally designated 190, depicting an adjustment of the shape or pattern (or energy) of a laser pulse 192. The vertical axis represents the relative intensity of a laser pulse, and the horizontal axis represents time. The vertical axis has been normalized to 1. Time $T_{CON}$ is the duration of time during which system 100 transmits laser pulse 192 at maximum intensity. Time $T_{WAVE}$ is the duration of time during which the intensity of transmitted laser pulse 192 decays in a shaped or patterned manner (or by its controlled energy). $T_{LASER}$ is the total duration of time that laser pulse 192 is transmitted and equals $T_{CON}+T_{WAVE}$. Time $T_{OFF\,LASER}$ is the duration of time during which laser device 102 (FIG. 1) is in an "off" state, i.e. laser device 102 does not transmit anything. Time $T_{OFF}$ is the duration of time during which sensor unit 104 does not receive anything due to its deactivation. Time $T_{ON}$ is the duration of time during which sensor unit 104 is in the "on" state and receives reflections. The times depicted in FIG. 12 are not proportionate, for example $T_{OFF\,LASER}$ may be much greater than $T_{LASER}$.

FIG. 13 is a graph, generally designated 200, depicting the advancement of the shaped or patterned laser pulse depicted in FIG. 12. The vertical axis represents the relative intensity of a laser pulse impinging upon an element, and the horizontal axis represents distance. The vertical axis has been normalized to 1. Graph 200 depicts a specific instant in time, in particular the moment that laser pulse 192 impinges on an element within the range $R_{MIN}$. Reflections from the element within range $R_{MIN}$ will require an additional amount of time in order to reach sensor unit 104 (FIG. 1). Sensor unit 104 will begin to collect photons, after an additional amount of time, in accordance with the shape or pattern of laser pulse 192. Photons in range $R_{MIN}$ exited at the end of laser pulse 192 and were able to reach range $R_A$, when sensor unit 104 is activated. Photons in range $R_{WAVE}$ (between distances $R_A$ and $R_B$) exited at the beginning of the intensity decline of laser pulse 192. Photons in range $R_{CON}$ (between distances $R_B$ and $R_C$) exited laser device 102 (FIG. 1) with maximum intensity at the beginning of the transmission of laser pulse 192.

It is appreciated that range $R_{MIN}$ depends on time $T_{OFF}$, which corresponds to the duration of time from the instance the end of laser pulse 192 reaches $R_{MIN}$ to the instance in which the end of laser pulse 192 reflects from $R_{MIN}$ and reaches sensor unit 104. This is the instance at which sensor unit 104 is activated ($T_{OFF}=2\times R_{MIN}/v$). Photons exiting at the end of laser pulse 192, which may reach sensor unit 104 after a period of time shorter than $T_{OFF}$, may not arrive when sensor unit 104 is activated. Therefore, photons reflected off of objects located within range $R_{MIN}$ from system 100 (FIG. 1) will not be received by sensor unit 104 and thus, such objects will not detected by system 100. It is further noted that relations such as $$\frac{1}{r^2}$$

define a laser pulse shape that drops in intensity dramatically. This drop in intensity may be advantageous in terms of minimizing reflections from an element at close range (ignoring the attenuation of laser pulse 192).

FIG. 14 is a sensitivity graph, generally designated 210, in accordance with the laser shaping technique depicted in FIG. 12, depicting the sensitivity of a gated sensor. The vertical axis represents relative sensitivity or gain, and the horizontal axis represents distance. The vertical axis has been normalized to 1. It is helpful to compare graph 210 with graph 180 of FIG. 9, where the technique of laser shaping was not applied.

Accordingly, range $R_{MIN}$ is the range from which reflections generated by the shaped or patterned pulse are not received by sensor unit 104 (FIG. 1). Range $R_{WAVE}$ is the range from which the reflections generated by the shaped or patterned pulse begin to be received and intensified. The curve along $R_{WAVE}$ results from the shape or pattern of the decay of laser pulse 192 (FIG. 12). The gradient along $R_{CON}$ results from the increasing amount of the maximum intensity portion of laser pulse 192, corresponding to $T_{CON}$ (FIG. 12), detected on sensor unit 104 (FIG. 1). The gradient along $R_{CON}$ also results from the different passing times between a laser pulse and elements in its path, as described with reference to FIGS. 5-7. Range $R_0$ to $R_1$ is the range from which the intensity of laser pulse 192 is steady. Range $R_1$ to $R_{MAX}$ is the range from which the intensity of laser pulse 192 decreases at a constant rate. Beyond $R_{MAX}$ is the range from which reflections are no longer detected on sensor unit 104. It is therefore possible to further reduce the sensitivity of system 100 (FIG. 1) at close ranges, and prevent reflections from atmospheric substances in the area substantially near system 100, by generating shaped or patterned laser pulses, in conjunction with a pulse width based timing for switching sensor unit 104 to the "on" state (as discussed with reference to FIGS. 7-9). It is appreciated that system sensitivity as a function of range is further improved with the implementation of a shaped or patterned laser pulse (or analogously varying the energy of the pulse), in addition to the results achieved by the gating technique per se.

Reference is now made to FIGS. 15-18. These graphs depict techniques for timing adjustments during the process of obtaining an individual video frame of received reflections from a target. These techniques illustrate the ability to change the duration of time sensor unit 104 (FIG. 1) is activated and/or the width of laser pulse 106 (FIG. 1) in order to achieve maximum sensitivity of system 100 (FIG. 1) at the optimum range $R_0$. It is appreciated that limiting the number of transmitted laser pulses without compromising image quality, reduces the sensitivity of the system to extraneous ambient light sources.

It is assumed that a video frame based system is utilized. The array of photodetectors of sensor unit 104 may be a standard video sensor, such as a CCD (Charge Coupled Device) or a CMOS (Complementary Metal Oxide Semiconductor) type of sensor. The CCD type sensor may include an external shutter. Such sensors typically operate at a constant frequency of approximately 50-60 Hz. This means that each second the array of photodetectors captures 25-30 frames. To demonstrate the technique, it is assumed that the array of photodetectors operates at 50 Hz. The duration of an individual frame is then 20 ms. Assuming the range of interest for system 100 is 300 m, the width of laser pulse 106 in addition to the duration of time that sensor unit 104 is set to the "on" state must add up to 3 µs. It is noted that the effect of $T_{OFF}$ is not considered for the purposes of this simplified example. This frequency of operation requires a cycle time of 3 µs with no time gaps (i.e. waiting times) between the end of laser pulse 106 and the opening of sensor unit 104. It is then possible to transmit up to 6666 pulses and to collect up to 6666 reflected pulses, in the course of an individual field, i.e. a video frame.

Figure 15:
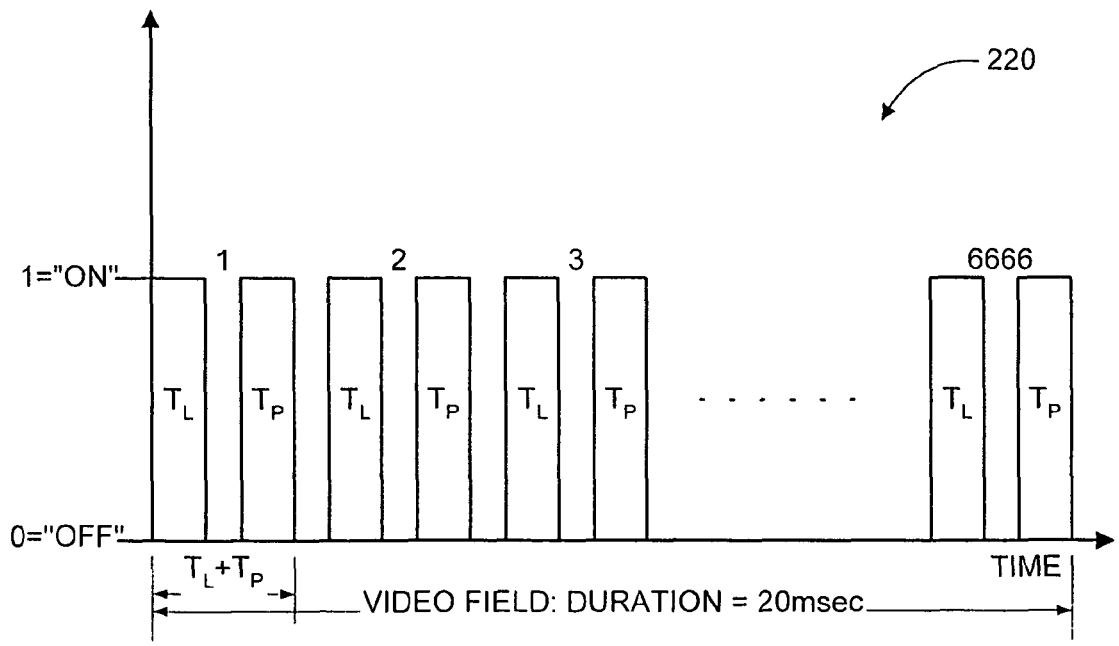
FIG. 15 is a graph depicting the sequence of pulse cycles and the collection of photons over an individual field, as a function of time.

FIG. 15 is a graph, generally designated 220, depicting the sequence of pulse cycles (L) and collection of reflected photons (P) over an individual field. The vertical axis represents the status of a device, where '1' represents a status of the device being on, and '0' represents a status of the device being off. The horizontal axis represents time. A cycle is defined as the time period required for one laser pulse to be transmitted and one reflected photon, or bundle of reflected photons, to be received. A cycle is therefore defined as $T_L+T_P$. $T_L$ defines an amount of time a laser device is on. $T_P$ defines an amount of time a sensor device is on. It is assumed that the lower the number of cycles required for obtaining a quality image, the greater the ability of a system to reduce the effects of ambient light sources, since a higher number of cycles increases a system's potential exposure to ambient light sources.

Figure 16:
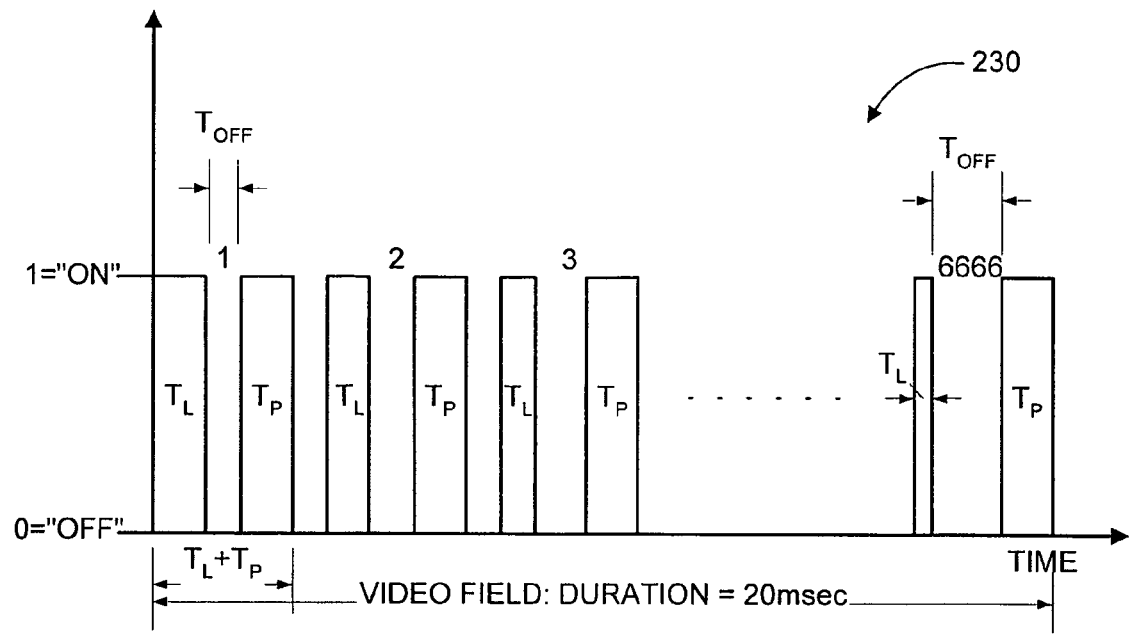
FIG. 16 is a graph depicting a timing technique where a laser pulse width is changed dynamically over the course of obtaining an individual frame, as a function of time.

FIG. 16 is a graph, generally designated 230, depicting a timing technique where a laser pulse width is changed dynamically over the course of obtaining an individual frame. The vertical axis represents the status of a device, where '1' represents a status of the device being on, and '0' represents a status of the device being off. The horizontal axis represents time. The total width of each cycle remains constant, although the width of laser pulse 106 ($T_L$) becomes narrower as time progresses, with the gap between $T_L$ and $T_P$ growing accordingly. By the final cycle, the width of laser pulse 106 is very short in comparison to its width in the first cycle, while the waiting time for the array of photodetectors to open ($T_{OFF}$) is very long in comparison to $T_{OFF}$ in the first cycle. The rate at which the waiting time, before sensor unit 104 is activated, is increased, is equal to the rate at which the width of laser pulse 106 is narrowed. Thus, the range $R_{MIN}$, from which no reflections are received from system 100, may be increased. In this manner, system 100 receives more reflections from the remote range than from the near range, and a desired sensitivity as a function of range is achieved.

Figure 17:
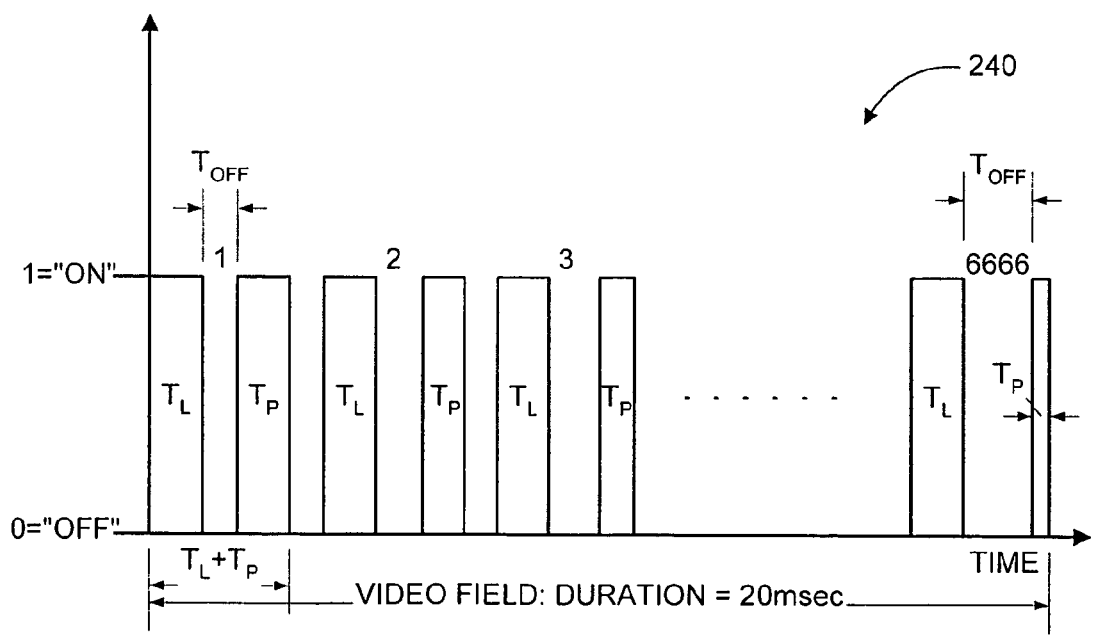
FIG. 17 is a graph depicting a timing technique where a duration that a sensor unit is activated is changed dynamically over the course of obtaining an individual frame, as a function of time.

FIG. 17 is a graph, generally designated 240, depicting a timing technique where the duration that a sensor unit is activated is changed dynamically over the course of obtaining an individual frame. The vertical axis represents the status of a device, where '1' represents a status of the device being on, and '0' represents a status of the device being off. The horizontal axis represents time. Similar to the technique shown in graph 230 of FIG. 16, the total width of each cycle remains constant although the duration that sensor unit 104 is set to the "on" state ($T_P$) becomes narrower as time progresses, with the gap between $T_L$ and $T_P$ growing accordingly. By the final cycle, the duration of $T_P$ is very short in comparison to its duration in the first cycle, while the waiting time for the array of photodetectors to open ($T_{OFF}$) is very long in comparison to $T_{OFF}$ in the first cycle. The rate at which the waiting time, before sensor unit 104 is activated, is increased, is equal to the rate at which the duration that sensor unit 104 is set "on" is narrowed. Thus, the range $R_{MIN}$, from which no reflections are received from system 100, may be increased. In this manner, system 100 receives more reflections from the remote range than from the near range, and a desired sensitivity as a function of range is achieved.

Figure 18:
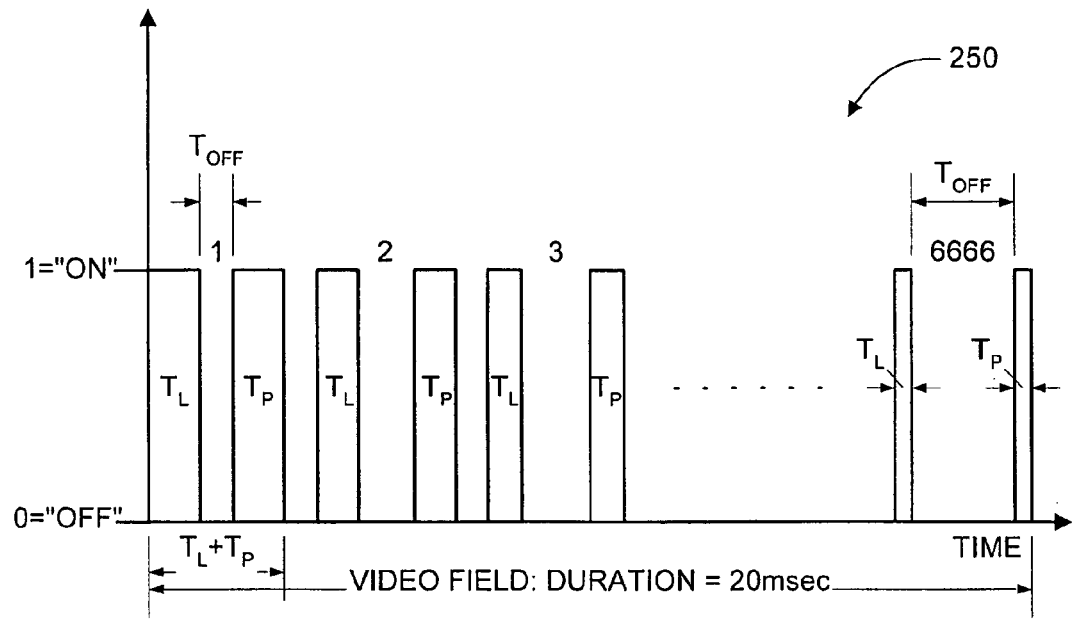
FIG. 18 is a graph depicting a timing technique where both a laser pulse width and a duration that a sensor unit is activated are changed dynamically over the course of obtaining an individual frame, as a function of time.

FIG. 18 is a graph, generally designated 250, depicting a timing technique where both a laser pulse width and the duration that a sensor unit is activated is changed dynamically over the course of obtaining an individual frame. The vertical axis represents the status of a device, where '1' represents a status of the device being on, and '0' represents a status of the device being off. The horizontal axis represents time.

It is noted that in graph 230 of FIG. 16, since time $T_P$ remains constant, system 100 will remain sensitive to the effects of ambient light sources for a longer period than the system of graph 240 of FIG. 17. Since $T_P$ remains constant, reflected energy not emitted by laser source 102 (FIG. 1) may be received by sensor unit 104. It is further noted that in graph 240 of FIG. 17, since time $T_L$ remains constant, system 100 will also remain sensitive to the effects of ambient light sources. Since time $T_L$ remains constant, part of the reflected energy may not return to sensor unit 104 in an activated mode, thereby using energy for a longer time period than the system of graph 230 in FIG. 16.

Similar to the techniques shown in graph 230 and graph 240 (FIGS. 16 and 17), the total width of each cycle remains constant. Both the width of laser pulse 106 ($T_L$) and the duration that sensor unit 104 is set to the "on" state ($T_P$) become narrower as time progresses, with the gap between $T_L$ and $T_P$ growing accordingly. By the final cycle, the duration of $T_L$ and the duration of $T_P$ are each very short in comparison to the first cycle, while the waiting time for the array of photodetectors to open, $T_{OFF}$, is very long in comparison to the first cycle. The rate at which the waiting time before sensor unit 104 is activated is increased is equal to the sum of the rates at which $T_L$ and $T_P$ are each narrowed. For example, if $T_L$ and $T_P$ are narrowed at the same rate, then $T_{OFF}$ is increased at twice this rate. In this technique, the time in which sensor unit 104 is activated and thereby susceptible to the effect of ambient light sources is shortened, thus exploiting the energy spent and received, by system 100, to a maximum. In this manner, system 100 receives more reflections from the remote range than from the near range, and a desired sensitivity as a function of range is achieved. This is provided at the "expense" of narrowing the depth of field, which means having $R_{MIN}$ approach $R_0$. Having $R_{MIN}$ approach $R_0$ is desirable when a target range is known more accurately. Narrowing the depth of field can also be compensated by enhancing the pulse intensity.

Timing adjustments during the process of obtaining an individual video frame may be employed in order to achieve a desired sensitivity as a function of range. This may involve dynamically changing the width of a laser pulse, the duration of time a sensor unit is set to the "on" state, or both. It is appreciated that the aforementioned techniques of timing adjustments may be integrated and combined with the aforementioned technique of changing the shape, pattern or energy of a laser pulse, as discussed with reference to FIGS. 12-14.

Figure 19:
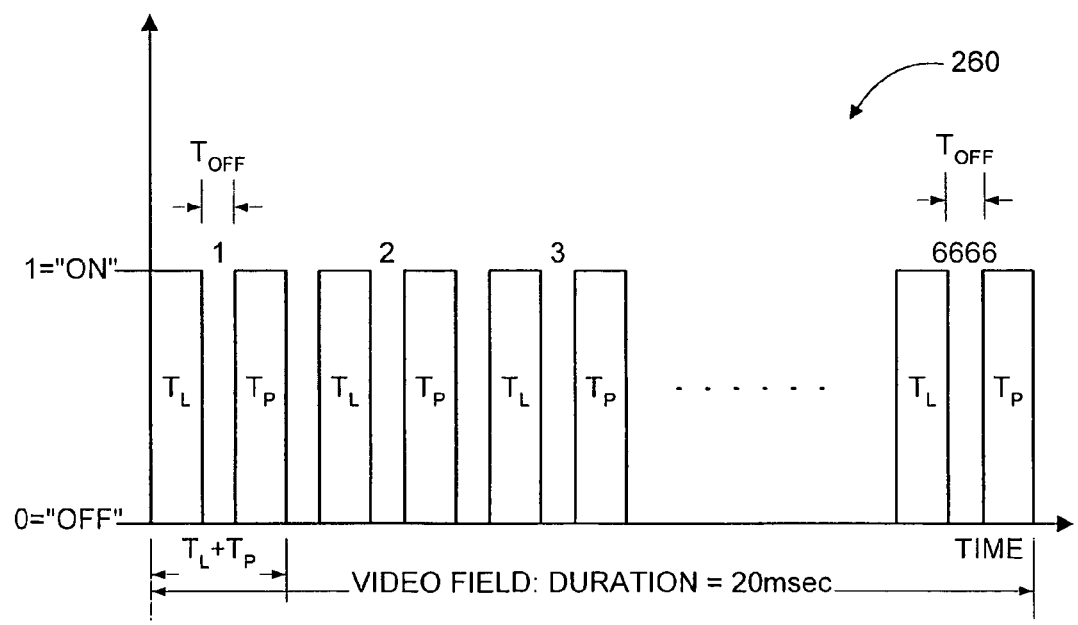
FIG. 19 is a graph depicting timing adjustments during the process of obtaining an individual video field, where a total of 6666 exposures are performed, as a function of time.
Figure 20:
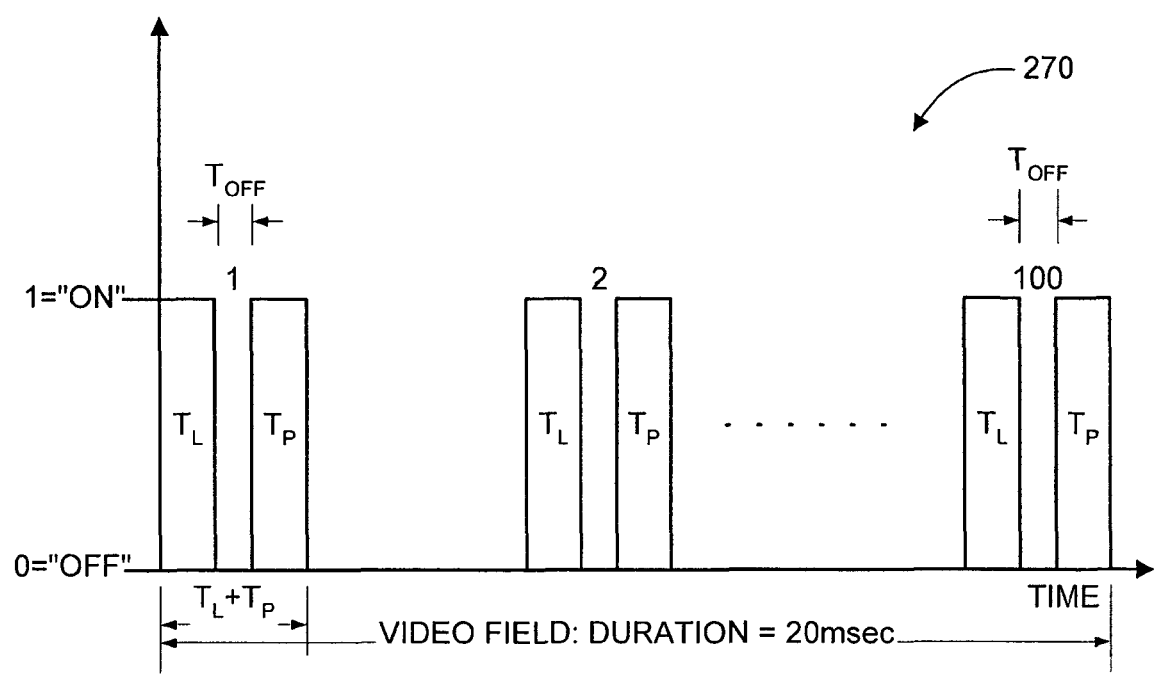
FIG. 20 is a graph depicting timing adjustments during the process of obtaining an individual video field, where a total of 100 exposures are performed, as a function of time.
Figure 21:
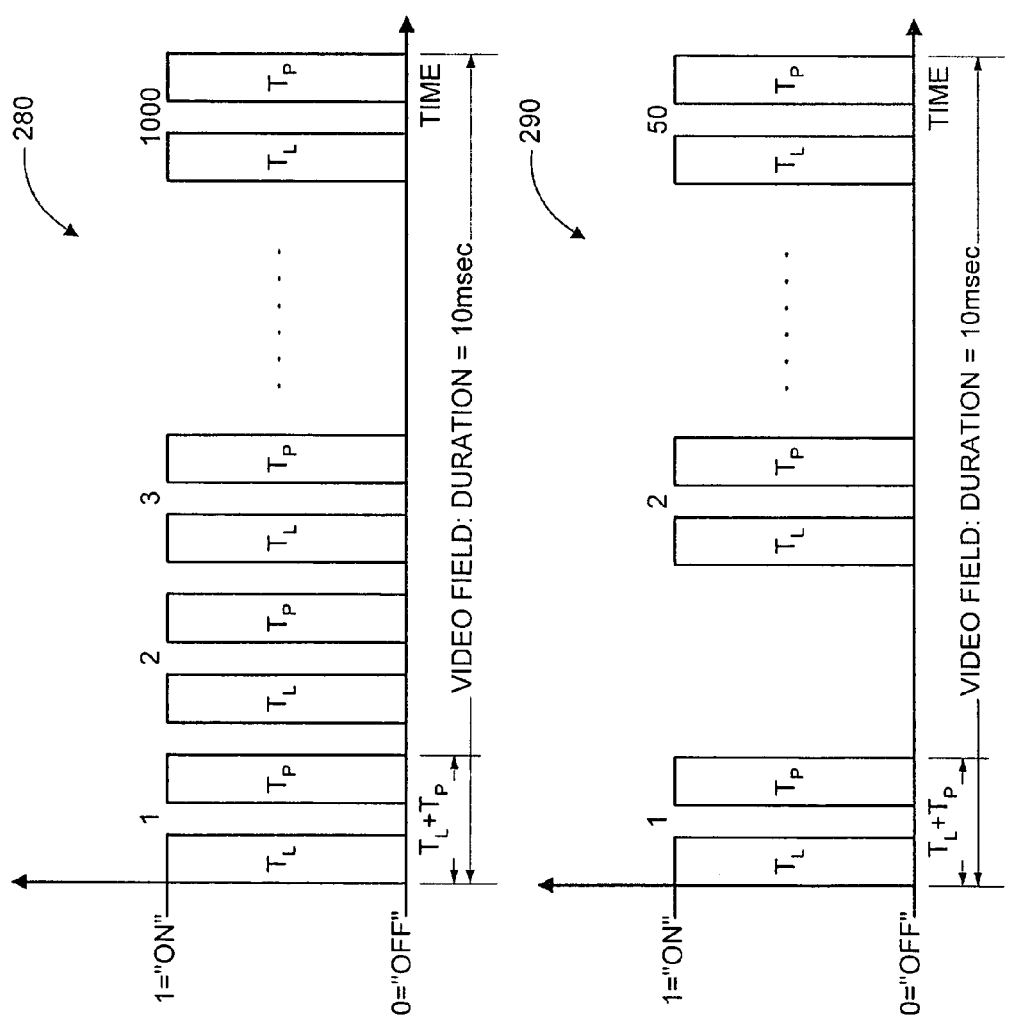
FIG. 21 is a pair of graphs depicting timing adjustments during the process of obtaining an individual video field, both as a function of time, where the number of exposures in a field is controlled based on an image processing technique.

Reference is now made to FIGS. 19-21. These graphs depict techniques for adjusting the number of cycles, or exposures, during the process of obtaining an individual video frame. These techniques serve to eliminate blooming, or self-blinding, arising from high intensity ambient light sources. Additionally, or alternatively, implementation of different image processing techniques may be utilized for this purpose. In particular, the rate of laser pulse transmissions (L) and collection of reflected photons (P) may be changed dynamically, thereby reducing the number of exposures.

It is recalled that in the example discussed earlier with reference to FIGS. 15-18, it is possible to transmit up to 6666 pulses and to collect up to 6666 reflected photons, in the course of an individual field. This means that a maximum number of 6666 cycles or exposures can be performed over a single field. However, it is also possible to perform fewer exposures. FIG. 19 is a graph, generally designated 260, depicting timing adjustments during the process of obtaining an individual video field, where a total of 6666 exposures are performed. The vertical axis represents the status of a device, where '1' represents a status of the device being on, and '0' represents a status of the device being off. The horizontal axis represents time. FIG. 20 is a graph, generally designated 260, depicting timing adjustments during the process of obtaining an individual video field, where a total of 100 exposures are performed. The vertical axis represents the status of a device, where '1' represents a status of the device being on, and '0' represents a status of the device being off. The horizontal axis represents time.

Reducing the number of exposures in a field might cause less photons to be collected at sensor unit 104 (FIG. 1), and thereby cause darkening in the generated image so that low reflection areas may not be visible. Therefore, the number of exposures in a field should be dynamically controlled. The number of exposures in a field may be controlled in accordance with several factors. For example, one factor may be the level of ambient light (information which may be received as an input to system 100 from an additional sensor which detects ambient light). Another factor may be the level of current consumed by sensor unit 104 (information which may be obtained via a power supply).

FIG. 21 is a pair of graphs, generally designated 280 and 290, depicting timing adjustments during the process of obtaining an individual video field, where the number of exposures in a field is controlled by a technique based on image processing. The vertical axis represents the status of a device, where '1' represents a status of the device being on, and '0' represents a status of the device being off. The horizontal axis represents time. This technique involves sensor unit 104 acquiring two frames. In one frame a large number of exposures are obtained, and in the other frame, a small number of exposures are obtained. In this embodiment of the disclosed technique, sensor unit 104 includes at least one photodetector, or an array of photodetectors, that operates faster than standard CCD or CMOS sensors. It is assumed that sensor unit 104 operates at a frequency of 100 Hz. The corresponding duration of each frame is then 10 ms. Graphs 280 and 290 depict sensor unit 104 acquiring two frames. In the first frame, graph 280, system 100 (FIG. 1) performs 1000 exposures, and in the second frame, graph 290, system 100 performs 50 exposures. As mentioned earlier, the number of exposures in a field may be controlled in accordance with several factors, such as the level of ambient light, the saturation state of the photodetectors, image processing constraints, and the like. After sensor unit 104 acquires two frames with a particular number of exposures in each, the two frames may be combined into a single frame. Dark areas may be combined from the frame having the larger number of exposures, and saturated areas may be combined from the frame having the smaller number of exposures.

Figure 22:
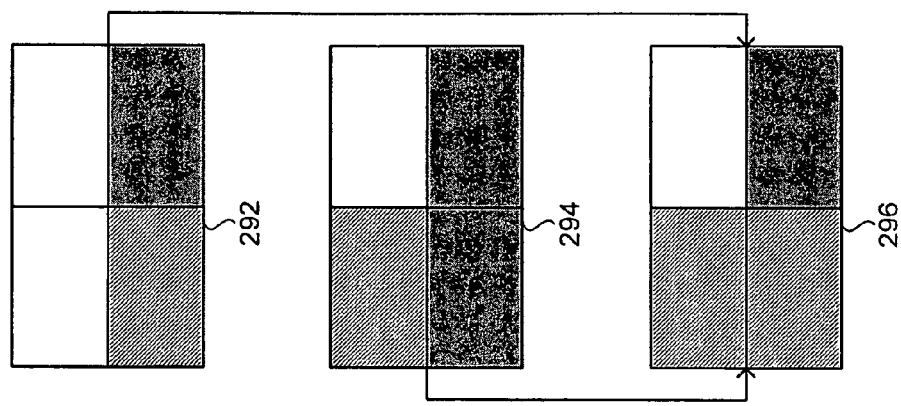
FIG. 22 is a schematic illustration of the two image frames acquired in FIG. 21, and the combination of the two frames.

FIG. 22 is a schematic illustration of the two image frames acquired in FIG. 21, and the combination of the two frames. It is assumed that the size of an image frame is 4 pixels, for simplicity. In the first frame 292, which originates from a large number of exposures, the upper pixels become saturated, while the lower pixels retain a reasonable level of gray. In the second frame 294, which originates from a smaller number of exposures, the upper left pixel does not become saturated, whereas the lower pixels are dark areas. In the combined image, the pixels from first frame 292 are combined with the pixels from second frame 294. The combined image frame 296 has less saturated pixels (only the upper right pixel), and less dark area pixels (only the lower right pixel). The overall image quality is thereby increased. The combination of the saturated upper left pixel in first frame 292 and the non-saturated upper left pixel in second frame 294 generates a non-saturated upper left pixel in combined frame 296.

The technique depicted in FIGS. 21 and 22 of two frame exposures followed by a frame combination enlarges the dynamic range of system 100 and provides a high quality image even in a saturated environment. It is appreciated that such image processing may be implemented via other techniques. For example, by using an even faster sensor, it is possible to combine a larger number of frames.

It is recalled that the blinding effect includes blinding caused by the operation of a similar system in the vicinity of system 100, herein known as mutual blinding. System 100 may overcome mutual blinding by applying statistical techniques or synchronization techniques. Statistical techniques may include reducing the number of exposures in the course of acquiring an individual video field and possibly compensating by using a greater laser intensity or a higher intensification level from sensor unit 104 (FIG. 1). The techniques may also include a random or predefined change in the timing of cycles throughout a single frame, changing the exposure frequency, or any combination of these techniques. Synchronization techniques may include establishing a communication channel between the two systems, for example, in the RF range. Such a channel would enable the two systems to communicate with each other. Another possible synchronization technique for overcoming mutual blinding is automatic synchronization.

Figure 23:
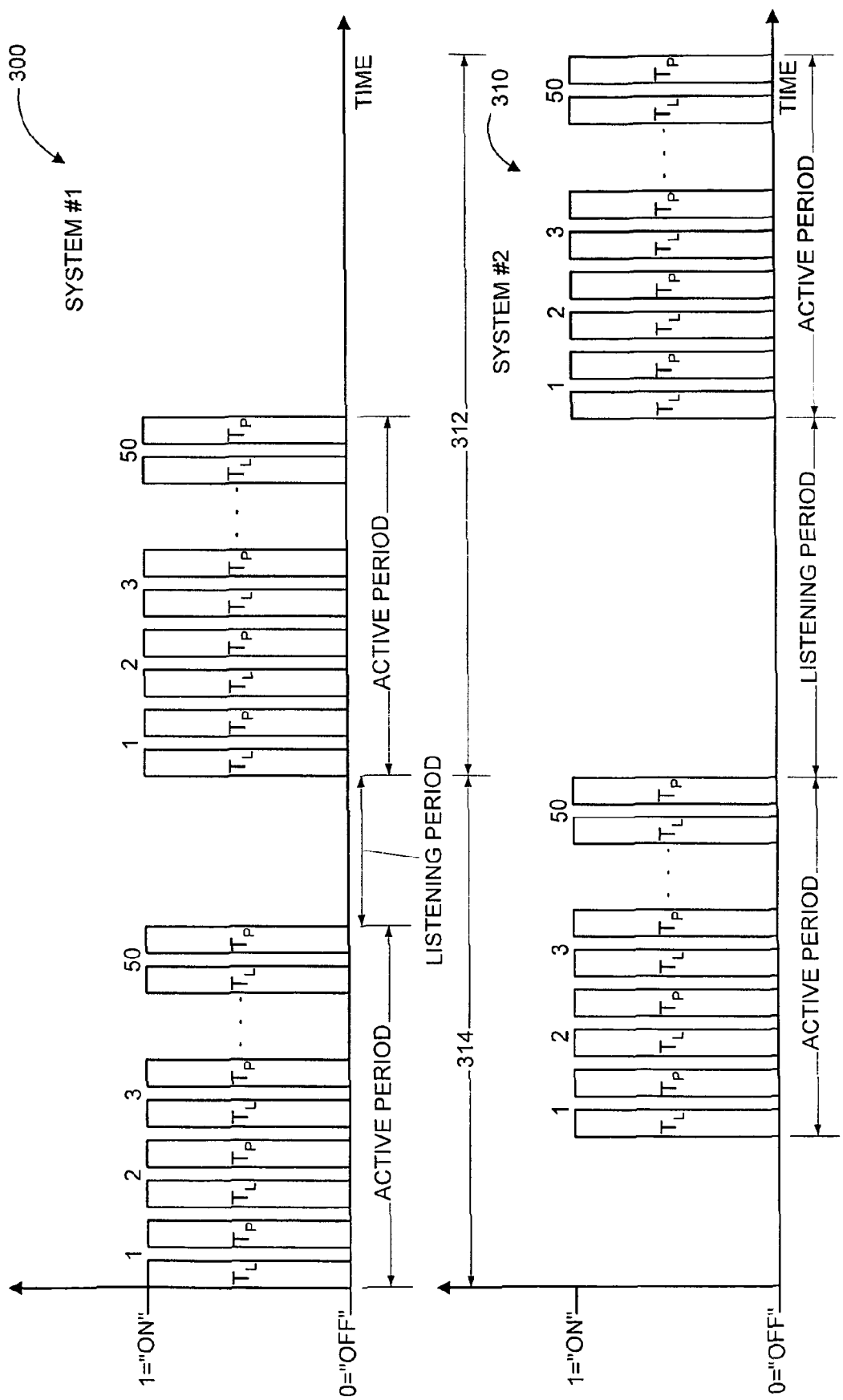
FIG. 23, which is a pair of graphs depicting a synchronization technique for overcoming mutual blinding, both as a function of time.

Reference is now made to FIG. 23, which is a pair of graphs, generally designated 310 and 320, depicting a synchronization technique for overcoming mutual blinding. The vertical axis represents the status of a device, where '1' represents a status of the device being on, and '0' represents a status of the device being off. The horizontal axis represents time. In the synchronization technique depicted in FIG. 23, one system enters a "listening period" every so often. When the system is in the listening period, the system refrains from transmitting laser pulses and collecting reflections. In the event that a second system does not transmit any pulses while the first system is in its listening period, section 312 of graphs 300 and 310, the first system may resume activity at the end of its listening period. In the event that the second system transmits pulses while the first system is in its listening period, section 314 of graphs 300 and 310, the first system waits until the end of the cyclic sequence of the second system before resuming activity. In graph 300, system #1 performs a cyclic sequence of 50 exposures before entering a listening period. In graph 310, system #2 performs a cyclic sequence only when system #1 is in a listening period. In this manner, synchronization between system #1 and system #2 ensures that no pulses transmitted by one system are received by the other system, resulting in interference and mutual blinding. It is noted that in the synchronization technique, 50% of the possible exposure time in a frame is allotted to each system.

The synchronization technique depicted in FIG. 23 may be applied, for example, in a night vision imaging system mounted on a moving platform (such as a vehicle), according to one embodiment of the disclosed technique. For the sake of illustrative purposes, reference will be made to a vehicle, as an example which is applicable to any moving platform. In this embodiment of the disclosed technique, a night vision imaging system mounted on a vehicle may include an interface with the vehicle's computer system (automotive BUS).

Two pulse detectors are mounted in the vehicle in which system 100 (FIG. 1) is installed. One pulse detector is installed in the front section of the vehicle, and the other pulse detector is installed in the rear section of the vehicle. The pulse detectors detect if other systems similar to system 100 are operating in vehicles approaching the vehicle of system 100 from the front or from the rear. Since a vehicle approaching from the rear is not likely to cause interference with system 100, synchronization may not be implemented in such a case.

An alternative synchronization technique for overcoming mutual blinding involves "sharing". For example, part of the listening period of a frame may be dedicated to detecting pulses transmitted by other systems. If no pulse is detected from another system, system 100 may randomly decide when laser device 102 (FIG. 1) may begin transmitting laser pulses within the same frame span. If a pulse from another system is detected however, system 100 initiates transmission of laser pulses at a random time only after the approaching pulse has ended. Alternatively, each system may randomly change their pulse start transmission timing in each frame. It is appreciated that these synchronization techniques for overcoming mutual blinding allow a system to synchronize with other systems that operate at different rates. Another possible synchronization technique for overcoming mutual blinding involves a synchronizing pulse transmitted by one system at a given time, while the other system adapts itself in accordance with the received synchronizing pulse.

Figure 24:
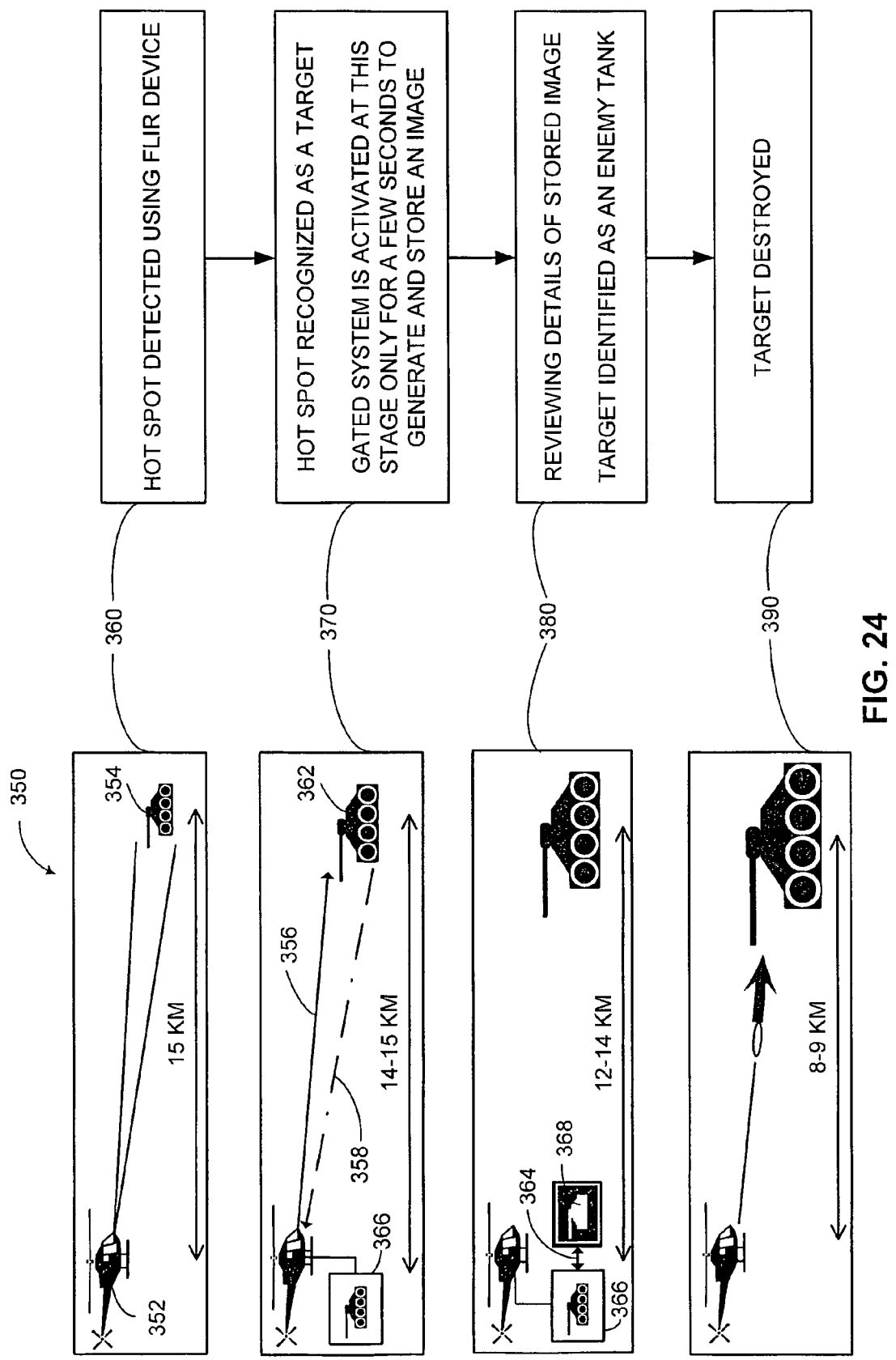
FIG. 24 is a block diagram of a method for target detection and identification, accompanied by an illustration of a conceptual operation scenario, operative in accordance with another embodiment of the disclosed technique.

Reference is now made to FIG. 24, which is a block diagram of a method for target detection and identification, accompanied by an illustration of a conceptual operation scenario, generally designated 350, operative in accordance with another embodiment of the disclosed technique. In conceptual operation scenario 350, an attack helicopter 352 equipped with an observation system in accordance with an embodiment of the disclose technique, such as system 100, is involved in an anti-tank operation at night.

In the first stage 360, the helicopter crew detects a hot spot 354 at a 15 km range using a FLIR (Forward Looking Infrared) device. In the second stage 370, when the helicopter is distanced only 14-15 km from hot spot 354, the surveillance and observation system is activated. Only during the course of this stage are laser energy beams emitted in direction 356 and reflected from the target in direction 358. The gated system is operated for only a few seconds. This is sufficient for storing in the system enough images from which an image 366 of target 362 is generated and stored. The radiating laser beam may expose helicopter 352. Limiting this exposure to a few seconds helps to protect helicopter 352 from counter-detection. In the third stage 380, the helicopter crew reverts to a passive operation mode, i.e. a relatively safer operation mode, while advancing towards the identified target 362. When the helicopter arrives at a distance of 12-14 km from target 362, the identification stage of image 366 is completed by reviewing its recorded details, such as by comparison 364 with other images of potential targets 368 stored in a data bank (not shown). In the example shown in FIG. 24, the hot spot is identified as a legitimate target, namely, an enemy tank. In the final stage 390, the helicopter crew activates a weapons system, for example a missile homing on the thermal radiation emitted by hot spot 354. The activated weapon destroys the target from a relatively distant range, for example from a range of 8-9 km.

It is noted that in the course of the operation, described by sequence 360 to 390, the system in helicopter 352 had no need to measure the exact range to target 362. Such a measurement would have necessitated operating the laser for an extended period of time, thereby increasing the likelihood of exposure and detection of helicopter 352 by an enemy.

Figure 25:
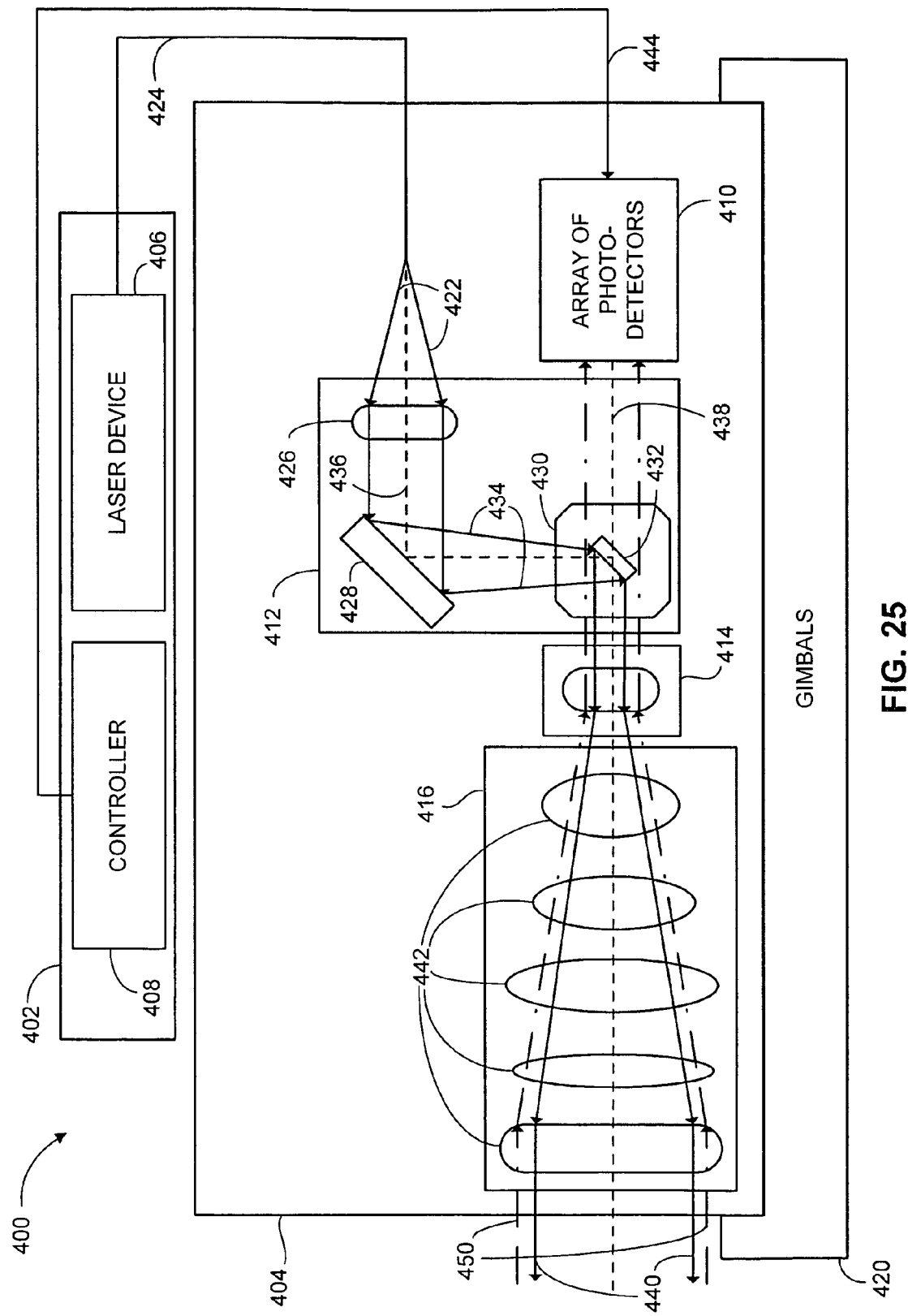
FIG. 25 is a schematic illustration of a system, constructed and operative in accordance with another embodiment of the disclosed technique.

Reference is now made to FIG. 25, which is a schematic illustration of a system, generally referenced 400, constructed and operative in accordance with another embodiment of the disclosed technique. System 400 is stabilized by a gimbals, and the optical axis of an illuminating laser beam is coupled with the optical axis of an observing section.

System 400 includes an external section 402 and an observation section 404. External section 402 includes a laser device 406 and an electronic controller 408. Observation section 404 includes at least one photodetector, or an array of photodetectors, 410, an optical coupling means 412, a coupling lens assembly 414, and an optical assembly 416. Laser device 406 is optically coupled with optical coupling means 412. Electronic controller 408 is coupled with array of photodetectors 410. Array of photodetectors 410 is further coupled with optical coupling means 412. Coupling lens assembly 414 is coupled with optical coupling means 412 and with optical assembly 416. Optical coupling means 412 includes a collimating lens 426, a first mirror 428 and an integrating lens assembly 430. Integrating lens assembly 430 includes a second mirror 432. First mirror 428 is optically coupled with collimating lens 426 and with integrating lens assembly 430. Optical assembly 416 includes an array of objective lenses 442. Gimbals 420 stabilizes observation section 404. Stabilization is required when system 400 is positioned on a continuously moving or vibrating platform, whether airborne, terrestrial or nautical, such as an airplane, helicopter, sea craft, land vehicle, and the like. Observation section 404 may also be stabilized by using feedback from a gyroscope to gimbals 420, by stabilization using image processing techniques, based on the spatial correlation between consecutively generated images, by stabilization based on sensed vibration, or in any combination of the above. External section 402 does not require specialized stabilization and may therefore be packaged separately and located separately from observation section 404. The stabilization may be based on detection of vibrations of the sensor means that influence the image as it is captured. Such sensor means in FIG. 25 may include observation section 404, photodetector(s) 410, optical coupling means 412, coupling lens assembly 414, and optical assembly 416, and their rigid packaging.

Laser device 406 transmits a pulsed laser beam 422 toward a target. Laser device 406 may be a Diode Laser Array (DLA). The transmitted laser beam 422 propagates through optical fiber 424. Optical fibers are used in system 400 to transmit laser beam 422 because they enable the laser beam spot size to be reduced to the required field-of-view (FOV). Optical fibers also allow for easy packaging. Furthermore, optical fibers transmit laser light such that no speckle pattern is produced when the laser light falls on a surface (laser devices, in general, produce speckle patterns when laser light falls on a surface). Laser device 406 is separate from observation section 404. Since laser device 406 may be inherently heavy this facilitates packaging and results in decreased weight in observation section 404.

Transmitted laser beam 42 propagates through optical fiber 424 toward collimating lens 426. Collimating lens 426 collimates transmitted laser beam 422. The collimated laser beam is conveyed toward first mirror 428. First mirror 428 diverts the direction of the collimated laser beam and converges the beam onto integrated lens assembly 430. Converged beam 434 reaches second mirror 432. Second mirror 432 is typically very small. Second mirror 432 couples the optical axis 436 of converged beam 434 with the optical axis 438 of observation section 404. Optical axis 438 is common to array of photodetectors 410 and to optical assembly 416. Second mirror conveys converged beam 434 toward coupling lens assembly 414. Coupling lens assembly conveys the beam toward array of objective lenses 442.

Array of objective lenses 442 collimates the beam once more and transmits the collimated laser beam 440 toward a target (not shown). Beam 440 illuminates the target, and the reflections of light impinging on the surface of the target return to optical assembly 416. Optical assembly 416 routes the reflected beam 450 toward array of photodetectors 410 via coupling lens assembly 414.

Array of photodetectors 410 processes reflected beam 450 and converts reflected beam 450 into an image displayable on a television. Array of photodetectors 410 may be a CCD (Charge Coupled Device) type sensor. In this case, the CCD sensor is coupled by relay lenses to a gated image intensifier, as is known in the art. The CCD type sensor may include external shutters. Alternatively, array of photodetectors 410 may be a Gated Intensified Charge Injection Device (GICID), a Gated Intensified CCD (GICCD), a Gated Image Intensifier, a Gated Intensified Active Pixel Sensor (GIAPS), and the like. It is noted that such sensor types enable advanced processing of the displayable television image, such as enlarging the image, identifying features, and the like. Advance processing may include, for example, comparing the image with a set of images in a databank of known identified target (see step 380 with reference to FIG. 24). The generated displayable television image may be subjected to additional processing. Such processing may include accumulating image frames via a frame grabber (not shown), integration to increase the quantity of light and to improve contrast, electronic stabilization provided by image processing techniques based on the spatial correlation between consecutively generated images, and the like.

Controller 408 controls the timing of array of photodetectors 410, and receives the displayable television image via suitable wiring 444. Controller 408 may include an electronics card. Controller 408 controls the timing of array of photodetectors 410 in synchronization with the laser pulses provided by laser device 406. The timing is such that array of photodetectors 410 will be closed during the time period that the laser beam traverses a distance adjacent to system 410 en route to the target (distance $R_{MIN}$, with reference to FIG. 1). Switching the sensor unit to the "off" state immediately after transmitting the laser beam ensures that unwanted reflections, from atmospheric substances and particles and backscatter, are not captured by array of photodetectors 410, and that the self-blinding phenomenon is avoided.

Figure 26:
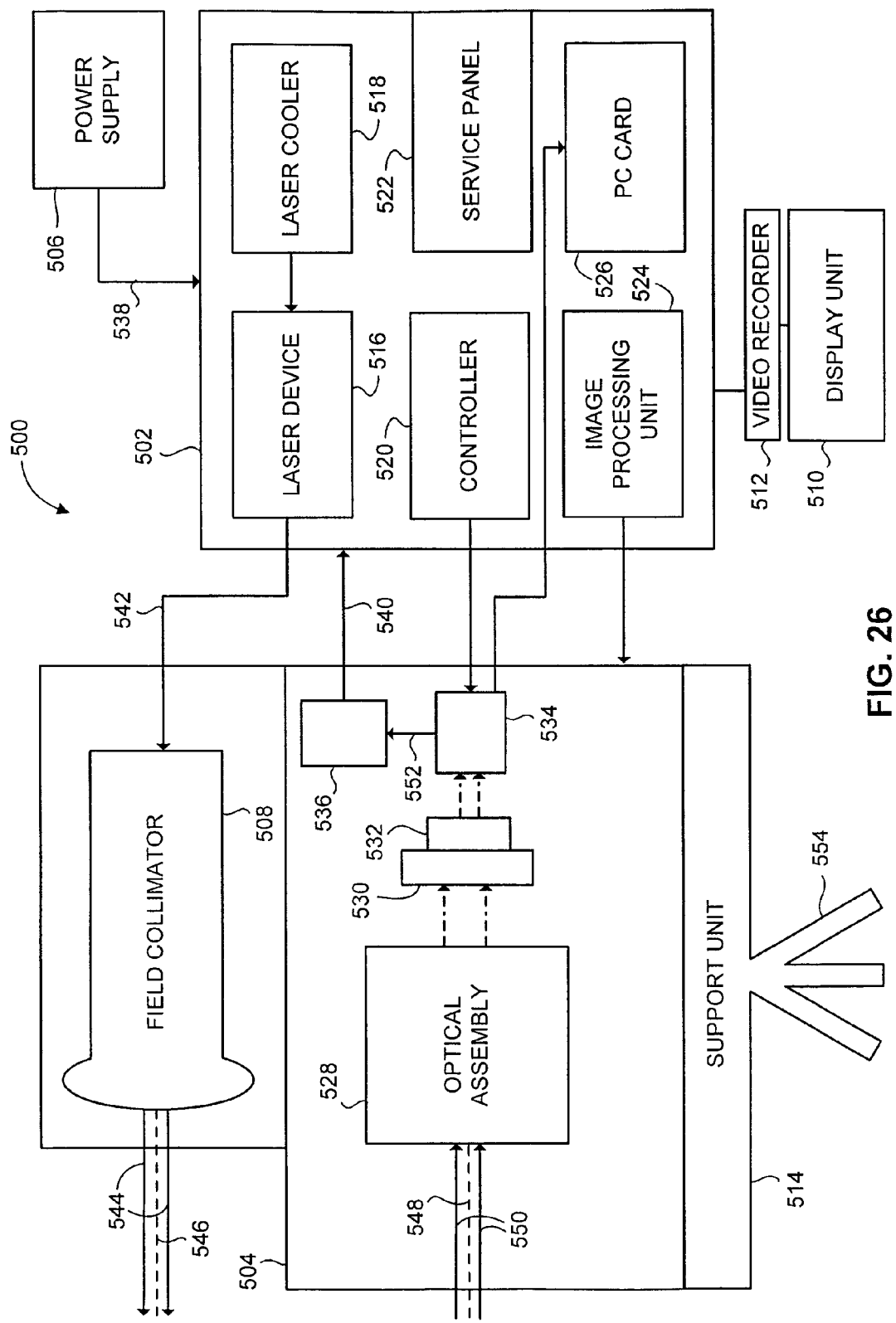
FIG. 26 is a schematic illustration of a system, constructed and operative in accordance with a further embodiment of the disclosed technique.

Reference is now made to FIG. 26, which is a schematic illustration of a system, generally referenced 500, constructed and operative in accordance with another embodiment of the disclosed technique. The optical axis of an illuminating laser beam in system 500 is essentially parallel with the optical axis of its array of photodetectors.

System 500 includes an electronics box 502, an observation module 504, a power supply 506, a narrow field collimator 508, a display 510, a video recorder 512, and a support unit 514. Electronics box 502 includes a laser device 516, a laser cooler 518, a controller 520, a service panel for technicians 522, an image processing unit 524 and a PC (Personal Computer) card 526. Observation module 504 includes an optical assembly 528, a filter 530, an optical multiplier 532, an array of photodetectors, or at least one photodetector, 534, and an electronics card 536. A spatial modulator shutter (not shown) may be located in front of array of photodetectors 534. A narrow field collimator 508 is installed on observation module 504. A power supply 506 is coupled with electronics box 502 via a connector 538. Electronics box 502 is coupled with observation module 504 via a cable 540. Electronics box 502 is optically coupled with narrow field collimator 508 via an optical fiber 542. Video recorder 512 is coupled with electronics box 502 and with display 510.

Laser device 516 transmits a pulsed laser beam 544 toward a target (not shown). Laser device 516 may be a DLA. Laser cooler 518 provides cooling for laser device 516. The transmitted laser beam 544 propagates through optical fiber 542 toward narrow field collimator 508. Collimator 508 collimates laser beam 544 so that the optical axis 546 of laser beam 544 is essentially parallel with the optical axis 548 of array of photodetectors 534, and conveys collimated laser beam 544 toward the target.

The reflected beam 550 from the target reaches optical assembly 528. Optical assembly 528 includes an array of narrow field objective lenses (not shown) packaged above support unit 514. Optical assembly 528 conveys reflected beam 550 to filter 530. Filter 530 performs spectral and spatial filtering on reflected beam 550. Filter 530 may locally darken an entrance of array of photodetectors 534 to overcome glare occurring in system 500. Image processing unit 524 provides control and feedback to filter 530. Filter 530 may be an adaptive Spatial Light Modulator (SLM), a spectral frequency filter, a polarization filter, a light polarizer, a narrow band pass filter, or any other mode selective filter. An SLM filter may be made up of a transmissive Liquid Crystal Display (LCD), a Micro-Electro-Mechanical System (MEMS), or other similar devices. Filter 530 may also be a plurality of filters. The characteristics of filter 530 suit the energy characteristics of reflected beam 550. Using feedback from image processing unit 524, filter 530 may be programmed to eliminate background radiation surrounding the target which is not within the spectral range of laser device 516. Residual saturation remaining on the eventual image as a result of ambient light sources in the field of view, for example artificial illumination, vehicle headlights, and the like, may be reduced by a factor of approximately $1/1000^{th}$ through adaptive SLM filtering. It is noted that other light sources in the field of view undergo additional filtering by the LPGI technique and by optic enlargement performed before reflected beam 550 is converted to a displayable image. This additional filtering is meant to facilitate separation between background light and the illuminated target, and to prevent blinding due to the presence of intense light sources in the immediate vicinity of system 500.

Filter 530 conveys reflected beam 550 to optical multiplier 532. Optical multiplier 532 enlarges reflected beam 550. It is noted that filter 530, or optical multiplier 532, or both, may be installed directly on the output end of optical assembly 528. Optical multiplier may also be installed directly on the input end of array of photodetectors 534. Array of photodetectors 534 receives reflected beam 550, and processes and converts reflected beam 550 to image data. Array of photodetectors 534 may be a CCD sensor. The CCD sensor may include external shutters. Array of photodetectors 534 transfers the image data to electronics card 536 via cable 552. Electronics card 536 transfers the image data to electronics box 502 via cable 540. Cable 540 may be any type of wired or wireless communication link. Controller 520 synchronizes the timing of array of photodetectors 534. Controller 520 ensures that array of photodetectors 534 is closed (i.e. the sensor unit is deactivated) when transmitted laser beam 544 traverses a range in the immediate vicinity of a target (i.e. range $R_{MIN}$, referring to FIG. 1) for both the forward and return paths. PC card 526 enables a user to interface with electronics box 502. PC card 526 is embedded with image processing capabilities. PC card 526 allows the image received from array of photodetectors 534 to be analyzed and processed. For example, such processing may include comparing the image to pictures of identified targets stored in a data bank, local processing of specific regions of the image, operation of the SLM function, and the like. The generated image may be presented on display 510 or recorded by video recorder 512. The image may be transferred to a remote location by an external communication link (not shown) such as a wireless transmission channel.

Power supply 506 supplies power to the components of electronics box 502 via connector 538. Power supply 506 may be a battery, a generator, or any other suitable power source. For example, an input voltage from power supply 506 allows laser device 516 to operate. Support unit 514 supports observation module 504, as well as narrow field collimator 508 installed above observation module 504. Support unit 514 provides for height and rotational adjustments. Support unit 514 may include a tripod (not shown), support legs 554 for fine adjustments, and an integral stabilization system (not shown) including, for example, viscous shock absorbers.

It is noted that DLA laser device 516 allows optical fibers to be used to convey transmitted laser beam 544. This facilitates packaging of laser device 516, which is typically heavy. Laser device 516 is also located separately from observation module 504, resulting in less weight on observation module 504. It is further noted that DLA laser device 516 generates a beam of laser energy having substantially high power for extended periods. Since the generated beam has a high frequency and a relatively low intensity, it may be routed via optical fibers which have limited durability for high intensity power, particularly at the peak.

It is further noted that a DLA laser device generates radiation in the near infrared spectral region, which is invisible to the human eye. However, this wavelength is also very close to the visible spectrum. Image intensifiers are very sensitive to this wavelength and provide good image contrast. Thus an image intensifier used in conjunction with a DLA laser device can provide high image quality even for targets at long ranges.

It is further noted that a DLA laser device generates non-coherent radiation. Therefore, the generated beam has very uniform radiation and results in an image of higher quality than if a coherent laser beam is used. It is further noted that a DLA laser device can operate in a "snapshot" observation mode. Snapshot observation involves transmitting a series of quick flash bursts, which diminishes the duration of time that the laser device is active. This reduces the exposure of a system and the risk of being detected by a foreign element.

It is further noted that in an embodiment of the disclosed technique where the system is stabilized on a gimbals, such as system 400 (FIG. 25), a DLA laser device enables switching of the array of photodetectors, allowing the array of photodetectors to operate on very short time spans with respect to the long damped vibrations of the gimbals. Such vibrations may cause blurring in the generated image. It is further noted that a DLA laser device is highly efficient in converting power to light. A DLA laser device delivers more light and less heat than other types of laser devices. Accordingly, the laser in the disclosed technique is transmitted through relatively wide optics and at relatively low intensities, so that the safety range is only a few meters from the laser. In contrast, in systems with laser range finders or laser designators, the safety range may reach tens of kilometers.

It is further noted that a DLA laser device is suitable for applications where laser transmission through a water medium is required, for example when performing sea surveillance from an airborne system, when performing underwater observation, or other nautical applications. For such applications, a laser beam in the blue-green range of the visible spectrum provides optimal performance.

It is noted that pulse emitting means (or transmitters) and the sensor described herein above are located in the same place, which is easier for the simultaneous control of the pulse and the sensor gating, and their timing or their synchronization. This location of the pulse emitting means and the sensor typifies cases when the path between the sensor and the object observed are obscured. However, the disclosed technique is not limited to such a configuration. The pulse emitter and the sensor may well be situated in two different locations, as long as their control, timing or synchronization are appropriately maintained for creating a sensitivity as a function of the range such that an amount of received energy of pulse reflections, reflected from objects located beyond a minimal range, progressively increases with the range along said depth of a field to be imaged. The relevant ranges (including minimal, optimal and maximal ranges, and the depth of a field) will then be described with respect to the sensor, rather than the emitter. This may be achieved by various technologies, including communication between the emitter and the sensor, with a controller, using an emitter signal bearing timing or other information picked up by the sensor, atomic clocks, a common clock, and the like. The pulse would then merely "reflect" at some angle rather than "reflect back" at 180 degrees from the observed objects toward the sensor. Thus any use of terms such as "back" in this context herein should be read as also referring to reflections at any angle from the objects to the sensor. Calculations illustrating the "to and fro" path towards the target and back to the sensor merely demonstrate one situation, and can be easily and analogously altered to calculations for other paths.

It will be appreciated by persons skilled in the art that the disclosed technique is not limited to what has been particularly shown and described hereinabove. Rather the scope of the disclosed technique is defined only by the claims, which follow.

The invention claimed is:

1. A portable, moveable or stationary mounted imaging system comprising:
    a transmission source, said transmission source providing at least one energy pulse;
    a sensor for receiving pulse reflections of said at least one energy pulse reflected from objects within a depth of a field to be imaged,
    characterized in that said depth of field having a minimal range, $R_{MIN}$, said sensor enabled to gate detection of said pulse reflections, with a gate timing controlled such that said sensor starts to receive said pulse reflections after a delay timing substantially given by the time it takes said at least one energy pulse to reach said minimal range and complete reflecting to said sensor from said minimal range,
    wherein each of said at least one energy pulse and said gate timing are controlled for creating a sensitivity as a function of range for said system, such that an amount of received energy of said pulse reflections, reflected from objects located beyond said minimal range, progressively increases with the range along said depth of a field to be imaged.

2. The system according to claim 1, wherein said at least one energy pulse and said gate timing are controlled for creating a sensitivity as a function of range for said system, such that an amount of received energy of said pulse reflections, reflected from objects located beyond said minimal range, progressively increases with the range along said depth of a field to be imaged until an optimal range, $R_O$.

3. The system according to claim 2, wherein said at least one energy pulse and said gate timing are controlled for creating a sensitivity as a function of range for said system, such that an amount of received energy of said pulse reflections, reflected from objects located beyond said optimal range, is maintained detectable until a maximal range, $R_{MAX}$.

4. The system according to claim 3, wherein said at least one energy pulse and said gate timing are controlled for creating a sensitivity as a function of range for said system, such that said amount of received energy of said pulse reflections, reflected from objects located beyond said optimal range, is maintained substantially constant until said maximal range.

5. The system according to claim 3, wherein said at least one energy pulse and said gate timing are controlled for creating a sensitivity as a function of range for said system, such that said amount of received energy of said pulse reflections, reflected from objects located beyond said optimal range, gradually decreases until said maximal range.

6. The system according to claim 1, wherein said at least one energy pulse and said gate timing are controlled for creating a sensitivity as a function of range for said system, such that an amount of received energy of said pulse reflections is directly proportional to the ranges of said objects to be imaged.

7. The system according to claim 1, wherein
    said at least one energy pulse defines a substantial pulse width, $T_{LASER}$, commencing at a start time, $T_0$;
    said delay timing is substantially given by the time elapsing from said start time, $T_0$, until twice said minimal range, $R_{MIN}$, divided by the speed at which said at least one energy pulse travels, v, in addition to said pulse width, $T_{LASER}$:

$$\frac{2 \times R_{MIN}}{v} + T_{LASER}.$$

8. The system according to claim 1, wherein said at least one energy pulse and said gate timing are controlled for creating a sensitivity as a function of range for said system through synchronization between the timing of said at least one energy pulse and the timing of said gate detection.

9. The system according to claim 1, wherein
    said at least one energy pulse defines a substantial pulse width, $T_{LASER}$, a pulse pattern, a pulse shape, and a pulse energy;
    said sensor is enabled to gate detection of said pulse reflections, with a gating time span said sensor is activated, $T_{ON}$, a duration of time said sensor is deactivated, $T_{OFF}$, and a synchronization timing of the gating with respect to said at least one energy pulse; and
    wherein at least one of said delay timing, said pulse width, said pulse shape, said pulse pattern, said pulse energy, said gating time span, said sensor is activated, $T_{ON}$, said duration of time said sensor is deactivated, $T_{OFF}$, and said synchronization timing, is determined according to at least one of said depth of a field to be imaged, specific environmental conditions said system is used in, a speed said system is moving at, and specific characteristics of different objects expected to be found in said depth of field.

10. The system according to claim 9, wherein said pulse width, said duration of time said sensor is deactivated, and said gating time span said sensor is activated define a cycle time, wherein
said at least one energy pulse is provided for a duration of said pulse width, the opening of said sensor is delayed for a duration of said duration of time said sensor is deactivated, and said pulse reflections are received for a duration of said gating time span said sensor is activated.

11. The system according to claim 9, wherein said determination according to at least one of said depth of a field, said specific environmental conditions, said speed said system is moving at, and said specific characteristics of different objects expected to be found in said depth of field, is a dynamic determination.

12. The system according to claim 11, wherein said pulse width and said gating time span are limited to reduce the sensitivity of said system to ambient light sources.

13. The system according to claim 12, wherein said pulse width is shortened progressively, said delay timing is lengthened progressively, and said cycle time does not change.

14. The system according to claim 12, wherein said gating time span is shortened progressively, said delay timing is lengthened progressively, and said cycle time does not change.

15. The system according to claim 12, wherein said pulse width and said gating time span are shortened progressively, said delay timing is lengthened progressively, and said cycle time does not change.

16. The system according to claim 1, wherein the gating of said sensor is utilized to create a sensitivity as a function of range for said system by changing a parameter selected from the group consisting of changing the shape of said at least one energy pulse, changing the pattern of said at least one energy pulse, changing the energy of said at least one energy pulse, changing a gating time span said sensor is activated, $T_{ON}$, changing a duration of time said sensor is deactivated, $T_{OFF}$, changing a pulse width, $T_{LASER}$, of said at least one energy pulse, changing said delay timing, and changing a synchronization timing between said gating and the timing of providing said at least one energy pulse.

17. The system according to claim 16, wherein said changing of a parameter is utilized according to at least one of: said depth of field, specific environmental conditions said system is used in, a speed said system is moving at, and characteristics of different objects expected to be found in said depth of field.

18. The system according to claim 8, further comprising a controller for controlling said synchronization.

19. The system according to claim 18, wherein at least one repetition of said cycle time forms part of an individual video frame, and a number of said repetitions forms an exposure number per said video frame.

20. The system according to claim 19, further comprising a control mechanism for dynamically controlling and varying said exposure number.

21. The system according to claim 20, wherein said exposure number is varied by said control mechanism according to a level of ambient light.

22. The system according to claim 21, further comprising an image intensifier.

23. The system according to claim 22, wherein said exposure number is varied by said control mechanism according to a level of current consumed by said image intensifier.

24. The system according to claim 20, wherein said control mechanism comprises image processing means for locating areas in said sensor in a state of saturation.

25. The system according to claim 2, wherein a pulse width, $T_{LASER}$, of said at least one energy pulse is substantially defined in accordance with the following equation:

$$2 \times \frac{R_0 - R_{MIN}}{v},$$

where v is the speed at which said at least one energy pulse travels.

26. The system according to claim 2, wherein said sensor is enabled to gate detection of said pulsed reflections, with a gating time span said sensor is activated, $T_{ON}$, and a duration of time said sensor is deactivated, $T_{OFF}$, which are substantially defined in accordance with the following equations:

$$T_{ON} = 2 \times \frac{R_0 - R_{MIN}}{v}$$

and $$T_{OFF} = \frac{2 \times R_{MIN}}{v} + T_{LASER},$$

where $T_{LASER}$ is the pulse width of said at least one energy pulse, and v is the speed at which said at least one energy pulse travels.

27. The system according to claim 1, further comprising a transmission device for transmitting images constructed from said pulse reflections received in said sensor.

28. The system according to claim 1, further comprising a pulse detector for detection of pulses emitting from a similar system.

29. The system according to claim 1, further comprising a polarizer for filtering out incoming energy, which does not conform to the polarization of said pulse reflection.

30. The system according to claim 29, wherein said transmission source provides at least one polarized energy pulse.

31. The system according to claim 10,
wherein said sensitivity of said system relates to a gain and responsiveness of said sensor in proportion to an amount of energy received by said sensor,
wherein said gain received by said sensor as a function of range R is defined by the follow convolution formula:

$$I_r(R) = \frac{\int_{T_{LASER}+T_{OFF}}^{T_{LASER}+T_{OFF}+T_{ON}} L\left(t - \frac{2R}{v}\right) \cdot C(t)\,dt}{T_{LASER}}$$

wherein L(t) defines a Boolean function representing an on/off status of said transmission source, irrespective of a state of said sensor,
wherein L(t)=1 if said transmission source is on and L(t)=0 if said transmission source is off,
wherein C(t) defines a Boolean function representing an ability of said sensor to receive incoming pulse reflections according to a state of said sensor,
wherein C(t)=1 if said sensor is in an activated state and C(t)=0 if said sensor is in a deactivated state,
and where v is the speed at which said at least one energy pulse travels.

32. The system according to claim 31, wherein a value for radiant intensity is obtained by multiplying said convolution formula by a geometrical propagation attenuation function.

33. An imaging system comprising:
a transmission source, said transmission source providing at least one energy pulse;
a sensor for receiving pulse reflections of said at least one energy pulse reflected from objects within a depth of a field to be imaged,
characterized in that said depth of field having a minimal range, $R_{MIN}$, said sensor enabled to gate detection of said pulse reflections, with a gate timing controlled such that said sensor starts to receive said pulse reflections after a delay timing substantially given by the time it takes said at least one energy pulse to reach said minimal range and complete reflecting to said sensor from said minimal range,
wherein said at least one energy pulse and said gate timing are controlled for creating a sensitivity as a function of range for said system, such that an amount of received energy of said pulse reflections, reflected from objects located beyond said minimal range, progressively increases with the range along said depth of a field to be imaged,
said at least one energy pulse defines a substantial pulse width, $T_{LASER}$, a pulse pattern, a pulse shape, and a pulse energy;
said sensor is enabled to gate detection of said pulse reflections, with a gating time span said sensor is activated, $T_{ON}$, a duration of time said sensor is deactivated, $T_{OFF}$, and a synchronization timing of the gating with respect to said at least one energy pulse,
wherein said sensitivity of said system relates to a gain and responsiveness of said sensor in proportion to an amount of energy received by said sensor,
wherein said gain received by said sensor as a function of range R is defined by the follow convolution formula:

$$I_r(R) = \frac{\int_{T_{LASER}+T_{OFF}}^{T_{LASER}+T_{OFF}+T_{ON}} L\left(t - \frac{2R}{v}\right) \cdot C(t)\,dt}{T_{LASER}}$$

wherein L(t) defines a Boolean function representing an on/off status of said transmission source, irrespective of a state of said sensor,
wherein L(t)=1 if said transmission source is on and L(t)=0 if said transmission source is off,
wherein C(t) defines a Boolean function representing an ability of said sensor to receive incoming pulse reflections according to a state of said sensor,
wherein C(t)=1 if said sensor is in an activated state and C(t)=0 if said sensor is in a deactivated state,
and where v is the speed at which said at least one energy pulse travels.

34. The imaging system according to claim 33, wherein a value for radiant intensity is obtained by multiplying said convolution formula by a geometrical propagation attenuation function.

35. A portable, moveable or stationary imaging method, the method comprising the procedures of:
emitting at least one energy pulse to a target area;
receiving at least one reflection of said at least one energy pulse reflected from objects within a depth of a field to be imaged,
characterized in that said depth of field having a minimal range, $R_{MIN}$, said receiving comprises gating detection of said at least one reflection such that said at least one energy pulse is detected after a delay timing substantially given by the time it takes said at least one energy pulse to reach said minimal range and complete reflecting; and
progressively increasing the received energy of said at least one reflection reflected from objects located beyond said minimal range along said depth of a field to be imaged, by controlling each of said at least one energy pulse and the timing of said gating.

36. The method according to claim 35, wherein said procedure of increasing comprises increasing the received energy of said at least one reflection reflected from objects located beyond said minimal range along said depth of a field to be imaged up to an optimal range, $R_O$.

37. The method according to claim 36, further comprising the procedure of maintaining detectable the received energy of said at least one reflection reflected from objects located beyond said optimal range along said depth of a field to be imaged up to a maximal range, $R_{MAX}$.

38. The method according to claim 37, wherein said procedure of maintaining comprises maintaining substantially constant said received energy of said at least one reflection reflected from objects located beyond said optimal range along said depth of a field to be imaged up to said maximal range.

39. The method according to claim 37, wherein said procedure of maintaining comprises gradually decreasing said received energy of said at least one reflection reflected from objects located beyond said optimal range along said depth of a field to be imaged up to said maximal range.

40. The method according to claim 35, wherein said procedure of increasing comprises increasing the received energy of said at least one reflection in direct proportion to the ranges of said objects within said depth of field to be imaged.

41. The method according to claim 35, wherein
said at least one energy pulse defines a substantial pulse width, $T_{LASER}$, commencing at a start time, $T_0$; and
said delay timing is substantially given by the time elapsing from said start time, $T_0$, until twice said minimal range divided by the speed at which said at least one energy pulse travels, v, in addition to said pulse width, $T_{LASER}$:

$$T_{LASER} + \frac{2 \times R_{MIN}}{v}.$$

42. The method according to claim 35, wherein
said at least one energy pulse defines a substantial pulse width, $T_{LASER}$, a pulse pattern, a pulse shape, and a pulse energy;
said procedure of gating comprises a gating time span a sensor utilized for said receiving is activated, $T_{ON}$, a duration of time said sensor is deactivated, $T_{OFF}$, and a synchronization timing of said gating with respect to said at least one energy pulse; and
wherein at least one of said delay timing, said pulse width, said pulse shape, said pulse pattern, said pulse energy, said gating time span said sensor is activated, $T_{ON}$, said duration of time said sensor is deactivated, $T_{OFF}$, and said synchronization timing is determined according to at least one of said depth of a field, specific environmental conditions said method is used in, a moving speed of said sensor, and specific characteristics of different objects expected to be found in said depth of field.

43. The method according to claim 35, wherein said procedure of controlling comprises progressively changing at least one parameter selected from the group consisting of changing a pattern of said at least one energy pulse, changing a shape of said at least one energy pulse, changing the energy of said at least one energy pulse, changing a gating time span a sensor utilized for said receiving is activated, $T_{ON}$, changing a duration of time said sensor is deactivated, $T_{OFF}$, changing an energy pulse width, $T_{LASER}$, of said at least one energy pulse, changing said delay timing, and changing a synchronization timing between said gating and said emitting.

44. The method according to claim 43, wherein said procedure of controlling comprises changing said at least one parameter according to at least one of said depth of field, said specific environmental conditions said method is used in, said moving speed of said sensor, and characteristics of different objects expected to be found in said depth of field.

45. The method according to claim 43, wherein said procedure of controlling comprises the sub-procedures of providing said at least one energy pulse for a duration of said pulse width, delaying the opening of said sensor for a duration of said time said sensor is deactivated, $T_{OFF}$, and receiving energy pulses reflected from objects for a duration of said gating time span said sensor is activated, $T_{ON}$, and wherein said pulse width, said duration of said time said sensor is deactivated, $T_{OFF}$, and said gating time span said sensor is activated, $T_{ON}$, define a cycle time.

46. The method according to claim 45, wherein at least one repetition of said cycle time forms part of an individual video frame, and a number of said repetitions forms an exposure number for said video frame.

47. The method according to claim 46, further comprising the procedure of dynamically varying said exposure number by a control mechanism.

48. The method according to claim 47, wherein said procedure of dynamically varying comprises adjusting said exposure number according to a level of ambient light by said control mechanism.

49. The method according to claim 47, further comprising the procedure of intensifying said detection of said at least one reflection, and wherein said procedure of dynamically varying comprises adjusting said exposure number by said control mechanism according to a level of current consumed by an image intensifier utilized for said intensifying.

50. The method according to claim 47, further comprising the procedure of image processing by locating areas in said sensor in a state of saturation by said control mechanism.

51. The method according to claim 47, further comprising the procedure of image processing for a variable number of exposures by said control mechanism.

52. The method according to claim 51, wherein said procedure of image processing comprises:
taking at least two video frames, one with a high exposure number, the other with a low exposure number, by image processing of a variable number of exposures;
determining exposure numbers for said at least two video frames; and
combining frames to form a single video frame by combining dark areas from frames with a high exposure number and saturated areas from frames with a low exposure number.

53. The method according to claim 43, wherein said procedure of increasing is dynamic.

54. The method according to claim 43, wherein said pulse width and said gating time span said sensor is activated, $T_{ON}$, are limited to eliminate or reduce the sensitivity of said sensor to ambient light sources.

55. The method according to claim 43, wherein said procedure of controlling comprises shortening said pulse width progressively and lengthening said delay timing progressively, while retaining a cycle time of the said gating unchanged.

56. The method according to claim 43, wherein said procedure of controlling comprises shortening said gating time span progressively and lengthening said delay timing progressively, while retaining a cycle time of said gating unchanged.

57. The method according to claim 43, wherein said procedure of controlling comprises shortening said pulse width and said gating time span progressively, lengthening said delay timing progressively, while retaining a cycle time of said gating unchanged.

58. The method according to claim 36, comprising calculating said energy pulse width, $T_{LASER}$, substantially defined in accordance with the following equation:

$$2 \times \frac{R_0 - R_{MIN}}{v},$$

where v is the speed said at least one energy pulse travels at.

59. The method according to claim 35, wherein said procedure of receiving comprises receiving several pulses of said at least one energy pulse reflected from objects during a gating time span a sensor utilized for said receiving is activated, $T_{ON}$.

60. The method according to claim 41, wherein said procedure of receiving comprises receiving several pulses of said at least one energy pulse reflected from objects during a gating time span a sensor utilized for said receiving is activated, $T_{ON}$;
said procedure of gating comprises a duration of time said sensor is deactivated, $T_{OFF}$; and
said procedure of controlling comprises controlling said gating time span said sensor is activated, $T_{ON}$, and a duration of time said sensor is deactivated, $T_{OFF}$, substantially defined in accordance with the following equations:

$$T_{ON} = 2 \times \frac{R_0 - R_{MIN}}{v}$$

and $$T_{OFF} = \frac{2 \times R_{MIN}}{v} + T_{LASER},$$

where $R_0$ is an optimal range.

61. The method according to claim 35, further comprising the procedure of intensifying said detection of said at least one reflection.

62. The method according to claim 35, further comprising the procedure of transmitting at least one image constructed from said received at least one reflection.

63. The method according to claim 35, further comprising the procedure of determining the level of ambient light in said target area.

64. The method according to claim 35, further comprising the procedure of determining if other energy pulses are present in said target area.

65. The method according to claim 61, further comprising the procedure of overcoming glare from other energy pulses by locally darkening the entrance of an image intensifier utilized for said intensifying.

66. The method according to claim 35, wherein said procedure of emitting comprises emitting at least one polarized electromagnetic pulse, and said procedure of receiving comprises filtering received energy according to a polarization conforming to an expected polarization of said at least one reflection.

67. An imaging method, the method comprising the procedures of:
 emitting at least one energy pulse to a target area;
 receiving at least one reflection of said at least one energy pulse reflected from objects within a depth of a field to be imaged,
 characterized in that said depth of field having a minimal range, $R_{MIN}$, said receiving comprises gating detection of said at least one reflection such that said at least one energy pulse is detected after a delay timing substantially given by the time it takes said at least one energy pulse to reach said minimal range and complete reflecting; and
 progressively increasing the received energy of said at least one reflection reflected from objects located beyond said minimal range along said depth of a field to be imaged, by controlling said at least one energy pulse and the timing of said gating,
 said at least one energy pulse defines a substantial pulse width, $T_{LASER}$, a pulse pattern, a pulse shape, and a pulse energy,
 said procedure of gating comprises a gating time span a sensor utilized for said receiving is activated, $T_{ON}$, a duration of time said sensor is deactivated, $T_{OFF}$, and a synchronization timing of said gating with respect to said at least one energy pulse,
 wherein a sensitivity of a sensor utilized for said receiving relates to a gain and responsiveness of said sensor in proportion to an amount of energy received by said sensor,
 wherein said gain received by said sensor as a function of range R is defined by the follow convolution formula:

$$I_r(R) = \frac{\int_{T_{LASER}+T_{OFF}}^{T_{LASER}+T_{OFF}+T_{ON}} L\left(t - \frac{2R}{v}\right) \cdot C(t) dt}{T_{LASER}}$$

wherein L(t) defines a Boolean function representing an on/off status of a transmission source utilized for said emitting, irrespective of a state of said sensor,
 wherein L(t)=1 if said transmission source is on and L(t)=0 if said transmission source is off,
 wherein C(t) defines a Boolean function representing an ability of said sensor to receive incoming pulse reflections according to a state of said sensor,
 wherein C(t)=1 if said sensor is in an activated state and C(t)=0 if said sensor is in a deactivated state,
 and where v is the speed at which said at least one energy pulse travels.

68. The imaging method according to claim 67, wherein a value for radiant intensity is obtained by multiplying said convolution formula by a geometrical propagation attenuation function.

* * * * *